(12) United States Patent
Leonard et al.

(10) Patent No.: US 8,205,910 B2
(45) Date of Patent: Jun. 26, 2012

(54) UTILITY VEHICLE HAVING MODULAR COMPONENTS

(75) Inventors: Joshua J. Leonard, North Branch, MN (US); Richard Raymond Maki, North Branch, MN (US); Eric Bjerketvedt, North Branch, MN (US); Michael D. Schneider, Dalbo, MN (US); Bradley Robert Morisch, Lindstrom, MN (US); Brian D. Krosschell, Chicago City, MN (US); Lionel Hoff, Oslo, MN (US); James Bergman, Oslo, MN (US); Doug Moman, Warren, MN (US); Mitchell D. Johnson, Roseau, MN (US); Larry Holter, Alvardo, MN (US); Richard Nelson, Oslo, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 12/092,151

(22) PCT Filed: Mar. 17, 2008

(86) PCT No.: PCT/US2008/003480
§ 371 (c)(1),
(2), (4) Date: Sep. 2, 2008

(87) PCT Pub. No.: WO2008/115459
PCT Pub. Date: Sep. 25, 2008

(65) Prior Publication Data
US 2009/0071739 A1    Mar. 19, 2009

Related U.S. Application Data

(60) Provisional application No. 60/918,356, filed on Mar. 16, 2007.

(51) Int. Cl.
*B62D 21/00*    (2006.01)
(52) U.S. Cl. ........................................................ 280/781
(58) Field of Classification Search .................. 180/209, 180/311, 312; 280/781, 785, 789; 410/104, 410/105, 107, 108, 113, 116
See application file for complete search history.

(56) References Cited

U.S. PATENT DOCUMENTS 2,672,103 A    3/1954   Hohmes
(Continued)

FOREIGN PATENT DOCUMENTS

CH    317 335 A    11/1956
(Continued)

OTHER PUBLICATIONS

International Search Report for PCT/US2008/003480 issued by the European Patent Office on Jun. 3, 2008.
(Continued)

*Primary Examiner* — Faye M. Fleming
(74) *Attorney, Agent, or Firm* — Faegre Baker Daniels LLP

(57) ABSTRACT

Multiple embodiments are disclosed which display modularity for accomplishing multiple modes of operation for a utility vehicle. The utility vehicle (100) may include a rear cargo platform (450), a plurality of connection points (460) disposed in matrix and adapted to couple an item to the rear cargo platform, and three or more couplings (490) for adding a subsection (470) in a non-pivotable manner or pivotably coupling the rear cargo platform. The vehicle may be a four-wheeled vehicle that coverts to a six-wheeled vehicle by the addition of the subsection. The utility vehicle may include a subsection cargo platform which may be coupled to the rear cargo platform and may pivot rearward. The utility vehicle may include couplings for adding a second subsection.

30 Claims, 39 Drawing Sheets

U.S. PATENT DOCUMENTS

| | | | |
|---|---|---|---|
| 3,508,764 A * | 4/1970 | Bexon et al. | 410/90 |
| 3,560,022 A * | 2/1971 | Gold | 410/156 |
| 3,858,902 A | 1/1975 | Howells et al. | |
| 4,027,892 A | 6/1977 | Parks | |
| 4,098,414 A | 7/1978 | Abiera | |
| 4,561,323 A | 12/1985 | Stromberg | |
| 4,821,825 A | 4/1989 | Somerton-Rayner | |
| 4,934,737 A | 6/1990 | Nakatsuka | |
| 4,941,784 A * | 7/1990 | Flament | 410/121 |
| 5,036,939 A | 8/1991 | Johnson et al. | |
| 5,251,713 A | 10/1993 | Enokimoto | |
| 5,549,428 A * | 8/1996 | Yeatts | 410/94 |
| 5,676,292 A * | 10/1997 | Miller | 224/524 |
| 5,863,277 A | 1/1999 | Melbourne | |
| 5,950,750 A | 9/1999 | Dong et al. | |
| 6,092,877 A | 7/2000 | Rasidescu et al. | |
| 6,149,540 A | 11/2000 | Johnson et al. | |
| 6,199,894 B1 | 3/2001 | Anderson | |
| 6,467,787 B1 | 10/2002 | Marsh | |
| 6,530,730 B2 * | 3/2003 | Swensen | 410/106 |
| 6,622,968 B1 | 9/2003 | St. Clair et al. | |
| 6,648,569 B2 * | 11/2003 | Douglass et al. | 410/46 |
| 6,695,566 B2 | 2/2004 | Rodriguez Navio | |
| 6,725,962 B1 | 4/2004 | Fukuda | |
| 6,752,235 B1 | 6/2004 | Bell et al. | |
| 6,786,526 B1 | 9/2004 | Blalock | |
| 6,799,779 B2 | 10/2004 | Shibayama | |
| 6,799,781 B2 | 10/2004 | Rasidescu et al. | |
| 6,916,142 B2 | 7/2005 | Hansen et al. | |
| 6,923,507 B1 | 8/2005 | Billberg et al. | |
| RE38,895 E * | 11/2005 | McLemore | 224/526 |
| 6,976,720 B1 * | 12/2005 | Bequette | 296/26.09 |
| 6,978,857 B2 | 12/2005 | Korenjak | |
| 7,055,454 B1 | 6/2006 | Whiting et al. | |
| 7,124,853 B1 | 10/2006 | Kole, Jr. | |
| 7,125,134 B1 | 10/2006 | Hedlund et al. | |
| 7,137,764 B2 * | 11/2006 | Johnson | 410/101 |
| 7,237,789 B1 | 7/2007 | Herman | |
| 7,239,032 B1 | 7/2007 | Wilson et al. | |
| 7,416,234 B2 * | 8/2008 | Bequette | 296/26.09 |
| 7,431,024 B2 | 10/2008 | Buchwitz et al. | |
| 7,682,115 B1 * | 3/2010 | Jay et al. | 410/101 |
| 7,703,826 B1 * | 4/2010 | German | 296/39.2 |
| 2002/0147072 A1 | 10/2002 | Goodell et al. | |
| 2002/0178968 A1 | 12/2002 | Christensen | |
| 2003/0001409 A1 | 1/2003 | Semple et al. | |
| 2004/0079561 A1 | 4/2004 | Ozawa et al. | |
| 2004/0108159 A1 | 6/2004 | Rondeau et al. | |
| 2004/0195797 A1 | 10/2004 | Nash et al. | |
| 2005/0173177 A1 | 8/2005 | Smith et al. | |
| 2005/0173180 A1 | 8/2005 | Hypes et al. | |
| 2005/0248116 A1 | 11/2005 | Fanson | |
| 2008/0023240 A1 | 1/2008 | Sunsdahl et al. | |
| 2008/0023249 A1 | 1/2008 | Sunsdahl et al. | |

FOREIGN PATENT DOCUMENTS

| | | |
|---|---|---|
| DE | 116 605 C | 2/1900 |
| DE | 17 55 101 A1 | 4/1971 |
| DE | 30 33 707 A1 | 4/1982 |
| EP | 0238077 A | 9/1987 |
| EP | 0 709 247 A | 5/1996 |
| EP | 0794096 A | 9/1997 |
| EP | 1 215 107 A | 6/2002 |
| EP | 1557345 A | 7/2005 |
| EP | 1 564 123 A | 8/2005 |
| JP | 11 334447 A | 12/1999 |
| JP | 2000 177434 A | 6/2000 |

OTHER PUBLICATIONS

International Search Report and Written Opinion for PCT/US2008/003485 issued by the European Patent Office on Aug. 27, 2008.
International Search Report and Written Opinion for PCT/US2008/003480 issued by the European Patent Office on Sep. 1, 2008.
International Search Report and Written Opinion for PCT/US2008/003483 issued by the European Patent Office on Oct. 2, 2008.
International Preliminary Report on Patentability for PCT/US2008/003483 issued by the European Patent Office on May 11, 2009.

* cited by examiner

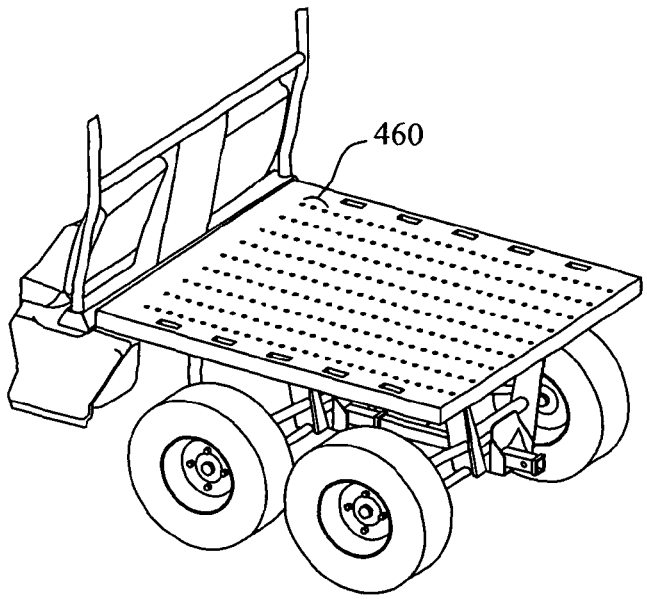
FIG. 17
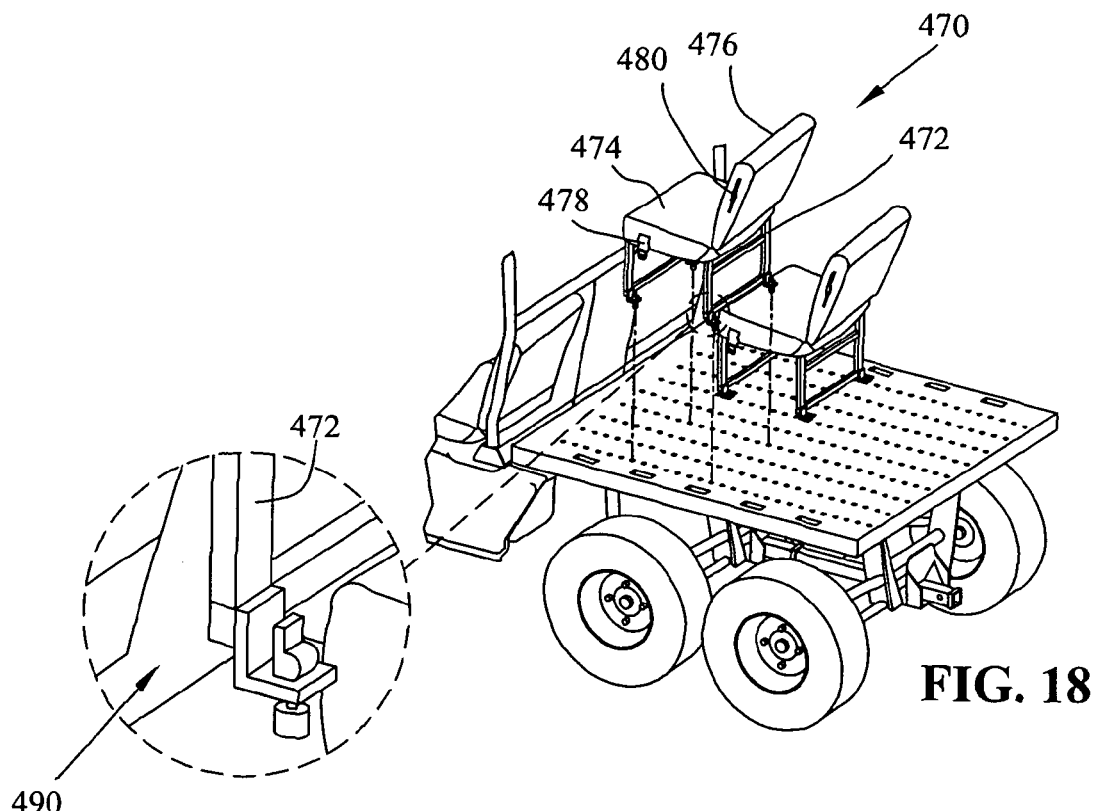
FIG. 18
FIG. 19

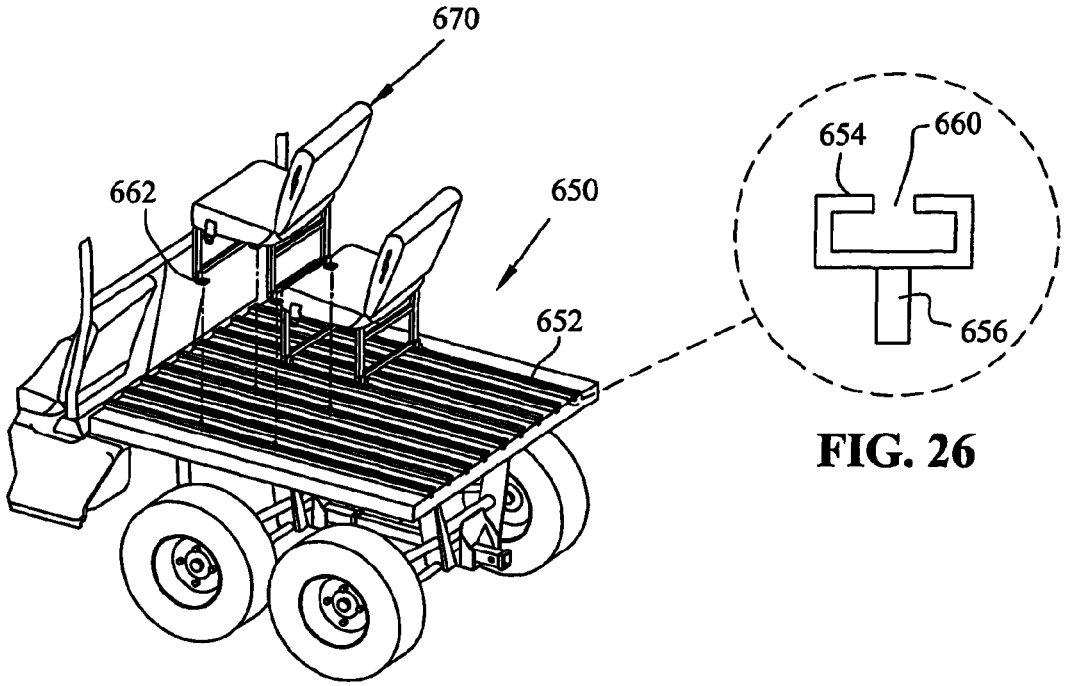
FIG. 25
FIG. 26
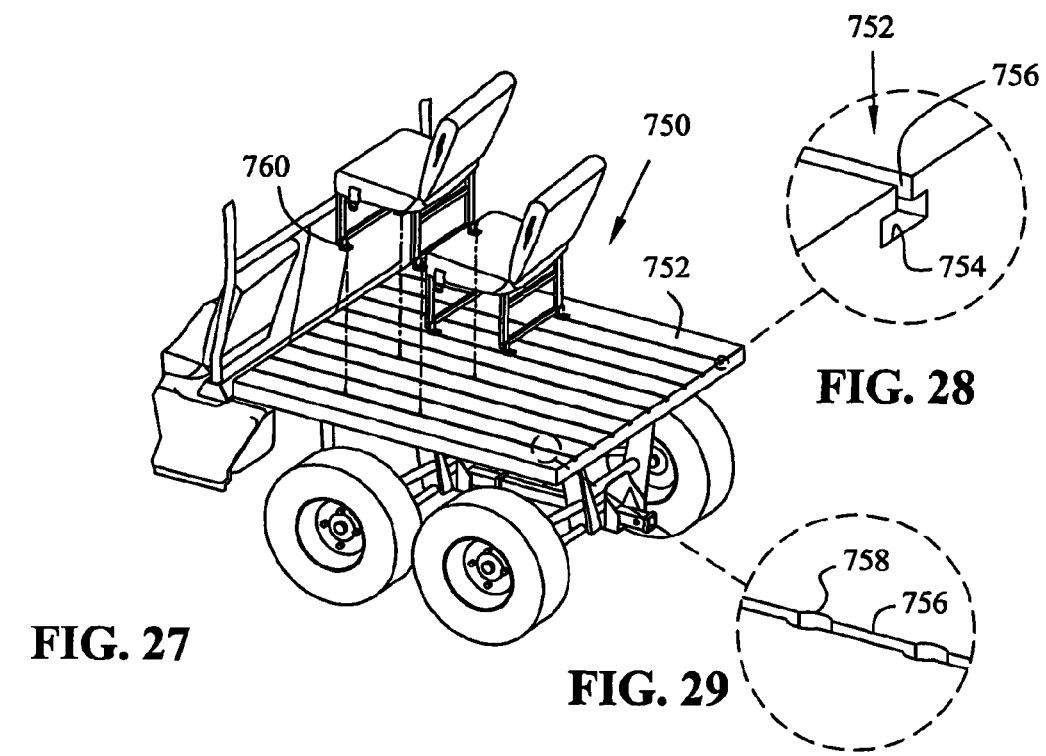
FIG. 27
FIG. 28
FIG. 29

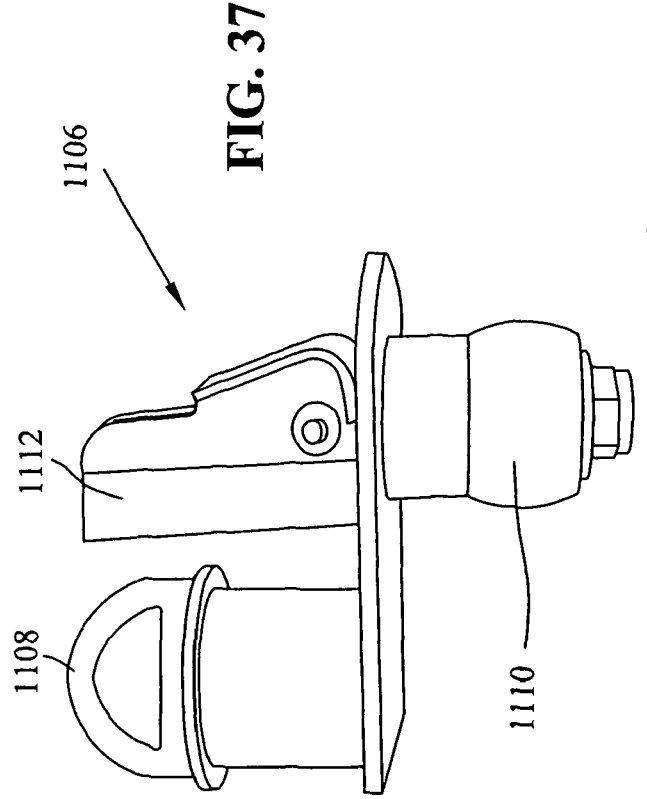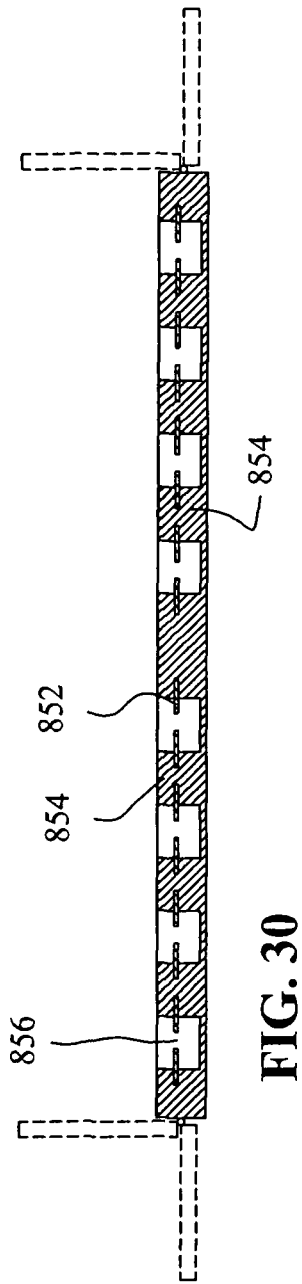

UTILITY VEHICLE HAVING MODULAR COMPONENTS

STATEMENT REGARDING FEDERALLY SPONSORED RESEARCH OR DEVELOPMENT

Portions of this application may be subject to the terms of contract number H92222-06-C-0039 with the United States Special Operations Command (SOCOM).

The present invention relates generally to a vehicle and in particular to a utility vehicle with modular features which can be modified between a four-wheeled configuration and a six-wheeled configuration.

Vehicles including utility vehicles, all-terrain vehicles, tractors, and others are known. It is known to provide a vehicle with a hitch and to attach sub-assemblies having axles to the hitch in a pivotal manner. Sub-assemblies generally include trailers. The vehicle's hitch powers such sub-assemblies. The hitch is configured to allow sub-assemblies to pivot vertically or horizontally or both about the hitch. It is also known to provide a vehicle with a cargo bed.

Utility vehicles are also available which comprise a plurality of ground engagement members, a main frame supported by a first portion of the plurality of ground engagement members, an engine supported by the main frame and configured to provide power to at least one of the plurality of ground engaging members, an operator area supported by the main frame, the operator area including seating for at least two occupants in a side-by-side arrangement, steering controls operatively coupled to at least a portion of the plurality of ground engagement members, and engine controls operatively coupled to the engine. For example, a utility vehicle of the type disclosed above is shown in our U.S. Pat. No. 6,923, 507.

It is also known to provide for connection of expansion retainers to an outer perimeter of an accessory platform, as shown in our U.S. Pat. No. 7,222,582.

Multiple embodiments are disclosed herein which display modularity for accomplishing multiple modes of operation for a utility vehicle.

In an exemplary embodiment, a utility vehicle may comprise a main frame supported by ground engaging members, an engine and a rear cargo platform. The vehicle rear cargo platform includes a plurality of connection points disposed in matrix and adapted to couple an item to the rear cargo platform is provided. The plurality of connection points are disposed in a matrix may be apertures or slots adapted to receive connectors.

The utility vehicle may have three or more couplings for adding a subsection in a non-pivotable manner or pivotably coupling the rear cargo platform. The vehicle may be a four-wheeled vehicle that converts to a six-wheeled vehicle by the addition of the subsection. The utility vehicle may include a subsection cargo platform. The subsection cargo platform may be coupled to the rear cargo platform and may pivot rearward. The utility vehicle may include couplings for adding a second subsection.

In another exemplary embodiment of the present invention, a utility vehicle has a two-portion cargo platform. The first portion is coupled to the frame of the vehicle, and the second portion is coupled to the first portion and may pivot forward until it lays on top of the first portion.

In a further exemplary embodiment of the present invention, a utility vehicle has a cargo platform with side panels that may pivot from an upright to a horizontal position to extend the width of the cargo platform. The panels may be removed and stored under the platform, and they may be coupled to the platform to be used as ramps.

In yet another exemplary embodiment of the present invention, a utility vehicle with a cargo box including a cargo platform, and front, rear, and side walls is provided. The utility vehicle may have three or more couplings for adding a subsection in a non-pivotable manner or pivotably coupling the cargo box. The subsection is supported by ground engaging members. The vehicle may be a four-wheeled vehicle that coverts to a six-wheeled vehicle by the addition of the subsection. The cargo box may be a sectional cargo box including a section coupled to the frame of the vehicle and a second section coupled to the first section in telescopic fashion.

In still another exemplary embodiment of the present invention, a utility vehicle with an exoskeletal frame is provided. The utility vehicle may include a cargo platform supported by the exoskeletal frame. The utility vehicle may have three or more couplings for adding a subsection in a non-pivotable manner. The subsection has an exoskeletal subsection frame. The vehicle may be a four-wheeled vehicle that coverts to a six-wheeled vehicle by the addition of the subsection. The walls of the cargo box may pivot and may be detached.

The above mentioned and other features of this invention, and the manner of attaining them, will become more apparent and the invention itself will be better understood by reference to the following description of embodiments of the invention taken in conjunction with the accompanying drawings, where:

FIG. 17 shows a one piece cargo box for use in a 6×6 configuration with the vehicle of FIG. 1;

FIG. 18 shows alternative seats for use with the cargo box of FIG. 17;

FIG. 19 is an enlarged view of a portion of FIG. 18;

FIG. 25 shows an alternate cargo box floor with additional slide rails;

FIG. 26 shows an enlarged portion of the slide rail of FIG. 25;

FIG. 27 shows another alternate embodiment of a cargo box floor with integrated T-slots;

FIG. 28 shows an enlarged portion of the T-slot of FIG. 27;

FIG. 29 shows an enlarged portion of the slot with an access opening along the length thereof;

FIG. 30 shows another end view of an alternate cargo box floor with integrated and recessed slots;

FIG. 37 shows an additional D-ring which can be placed in the apertures of the cargo box floor;

Corresponding reference characters indicate corresponding parts throughout the several views. Unless stated otherwise the drawings are proportional.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as all-terrain vehicles, motorcycles, snowmobiles, and golf carts.

Figure 1:
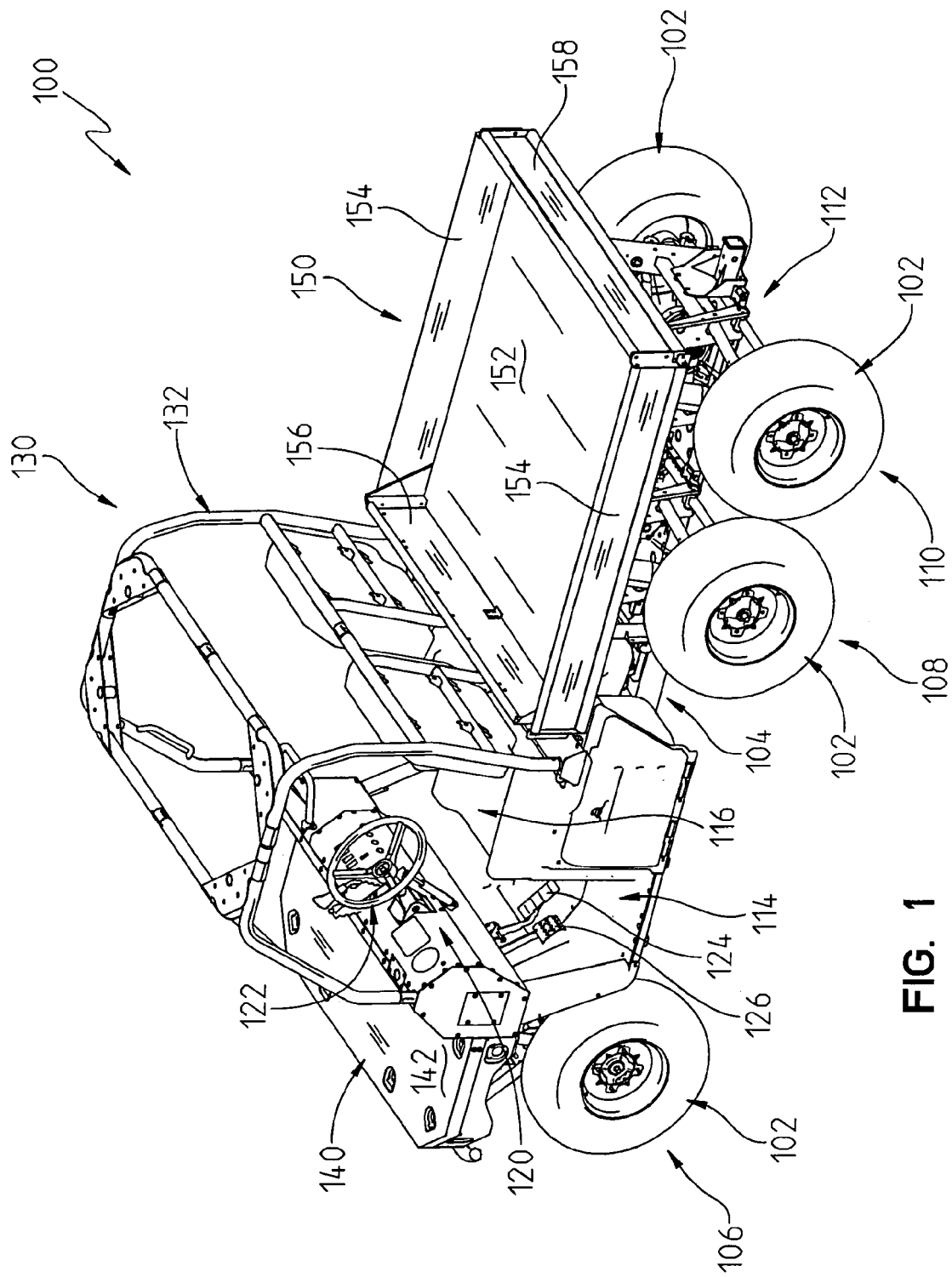
FIG. 1 is a rear, perspective view of a vehicle from a first side of the vehicle, the vehicle including a front platform and a rear platform.
Figure 2:
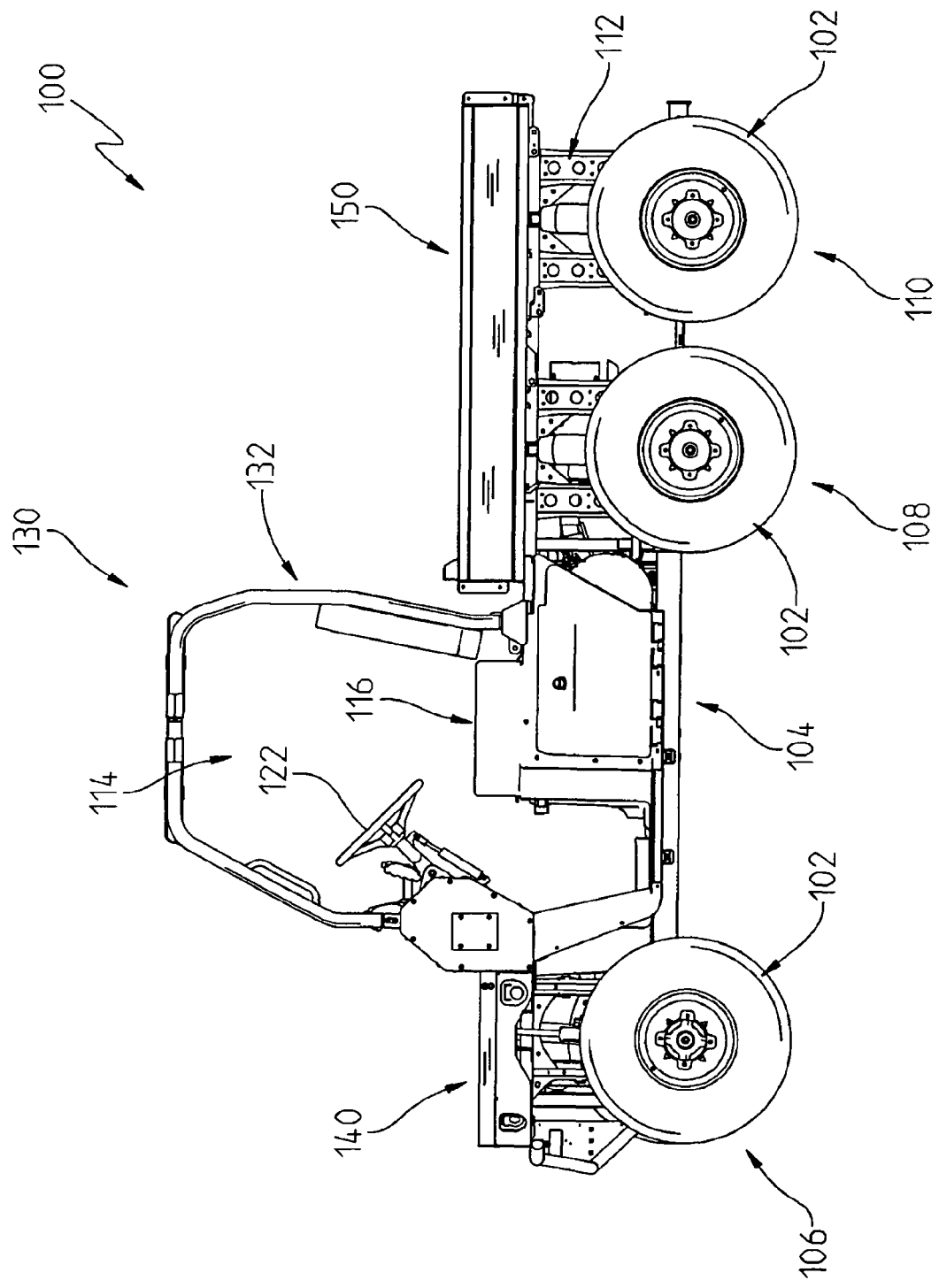
FIG. 2 is a side view of the first side of the vehicle of FIG. 1.
Figure 3:
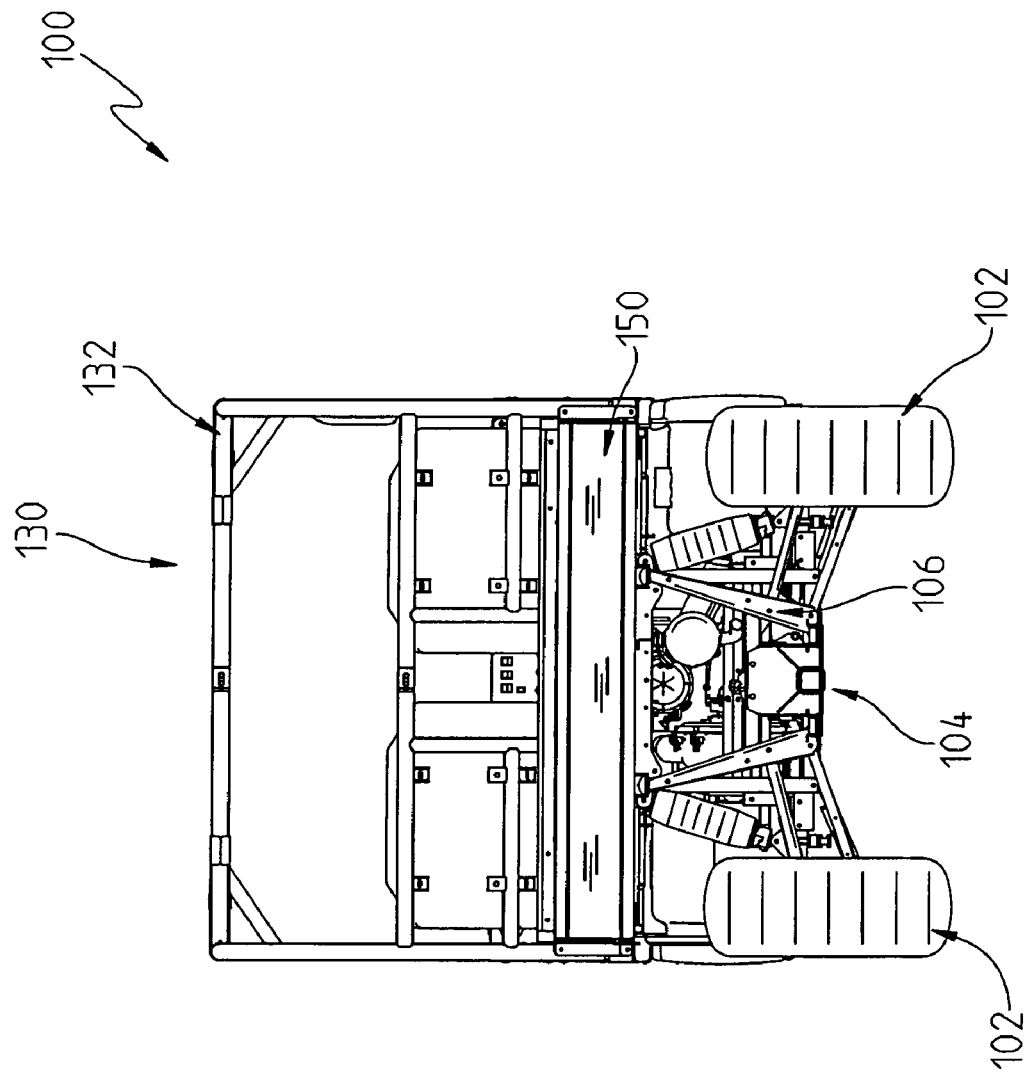
FIG. 3 is a rear view of the vehicle of FIG. 1.

Referring to FIG. 1, an illustrative embodiment of a vehicle 100 is shown. Vehicle 100 as illustrated includes a plurality of ground engaging members 102, illustratively wheels. A first set of wheels, one on each side of vehicle 100, generally correspond to a front axle 106. A second set of wheels, one on each side of vehicle 100, generally correspond to a middle axle 108. A third set of wheels, one on each side of vehicle 100, generally correspond to a rear axle 110.

In one embodiment, one or more of the wheels may be replaced with tracks, such as the Prospector II Tracks available from Polaris Industries Inc. located at 2100 Highway 55 in Medina, Minn. 55340. In one embodiment, a track is placed around the tires of the wheels middle axle 108 and rear axle 110 on each side of vehicle 100.

Vehicle 100 further includes a frame 104 supported by the plurality of ground engaging members 102. As explained in more detail in U.S. Provisional Application Ser. No. 60/918,502 filed Mar. 16, 2007, titled "VEHICLE", frame 104 includes a modular subsection 112 which is supported by rear axle 110. Modular subsection 112 may be removed from the remainder of vehicle 100 to convert vehicle 100 from a six-wheeled vehicle to a four-wheeled vehicle. Further, additional modular subsections 112 may be added to vehicle 100 to convert vehicle 100 from a six-wheeled vehicle to an eight-wheeled vehicle or more.

Vehicle 100 includes an operator area 114 which includes seating 116 for one or more passengers. Operator area 114 further includes a plurality of operator controls 120 by which an operator may provide input into the control of vehicle 100. Controls 120 include a steering wheel 122 which is rotated by the operator to change the orientation of one or more of ground engaging members 102, such as the wheels associated with front axle 106, to steer vehicle 100.

Controls 120 also include a first foot pedal 124 actuatable by the operator to control the acceleration and speed of vehicle 100 through the control of an engine described in more detail in U.S. Provisional Application Ser. No. 60/918, 502 filed Mar. 16, 2007, titled "VEHICLE", and a second foot pedal 126 actuatable by the operator to decelerate vehicle 100 through a braking system described in more detail in U.S. Provisional Application Ser. No. 60/918,502 filed Mar. 16, 2007, titled "VEHICLE". Additional details regarding the operator area, including controls 120, are provided in U.S. Provisional Application Ser. No. 60/918,556 filed Mar. 16, 2007, titled "VEHICLE", and U.S. Provisional Application Ser. No. 60/918,444, filed Mar. 16, 2007, titled "VEHICLE WITH SPACE UTILIZATION".

Frame 104 includes a portion 130 extending above operator area 114. Portion 130 is provided to protect the occupants of operator area 114 if vehicle 100 tips or rolls over. In the illustrated embodiment, portion 130 is a roll cage 132. In one embodiment, portion 130 is moveable from a first position protecting operator area 114 to a second position which provides vehicle 100 with a smaller envelope than when portion 130 is in the first position. Additional details about exemplary moveable portions are provided in U.S. Provisional Application Ser. No. 60/918,500, filed Mar. 16, 2007, titled "METHOD AND APPARATUS RELATED TO TRANSPORTABILITY OF A VEHICLE".

Vehicle 100 further includes a front platform 140 supported by frame 104 and a rear platform 150 also supported by frame 104. Both front platform 140 and rear platform 150 are shown having a support surface 142 and 152, respectively. Support surfaces 142 and 152 may be flat, contoured, and/or comprised of several sections. In addition, one or both of front platform 140 and rear platform 150 may include upstanding walls to define a cargo box extending over at least a portion of the respective platform 140 and 150.

Further, portions of front platform 140 and rear platform 150, along with portion 130 of frame 104 may include devices for attaching various types of assets to vehicle 100. Exemplary assets including cargo containers, seats, gun mounts, footrests, and other suitable assets, as described herein. Additional details regarding front platform 140 and rear platform 150 are provided in U.S. Provisional Application Ser. No. 60/918,556 filed Mar. 16, 2007, titled "VEHICLE"; and/or U.S. Provisional Application Ser. No. 60/918,444, filed Mar. 16, 2007, titled "VEHICLE WITH SPACE UTILIZATION".

With the vehicle 100 generally described above, rear platform 150 and frame 104 will be described in greater detail.

Figure 7:
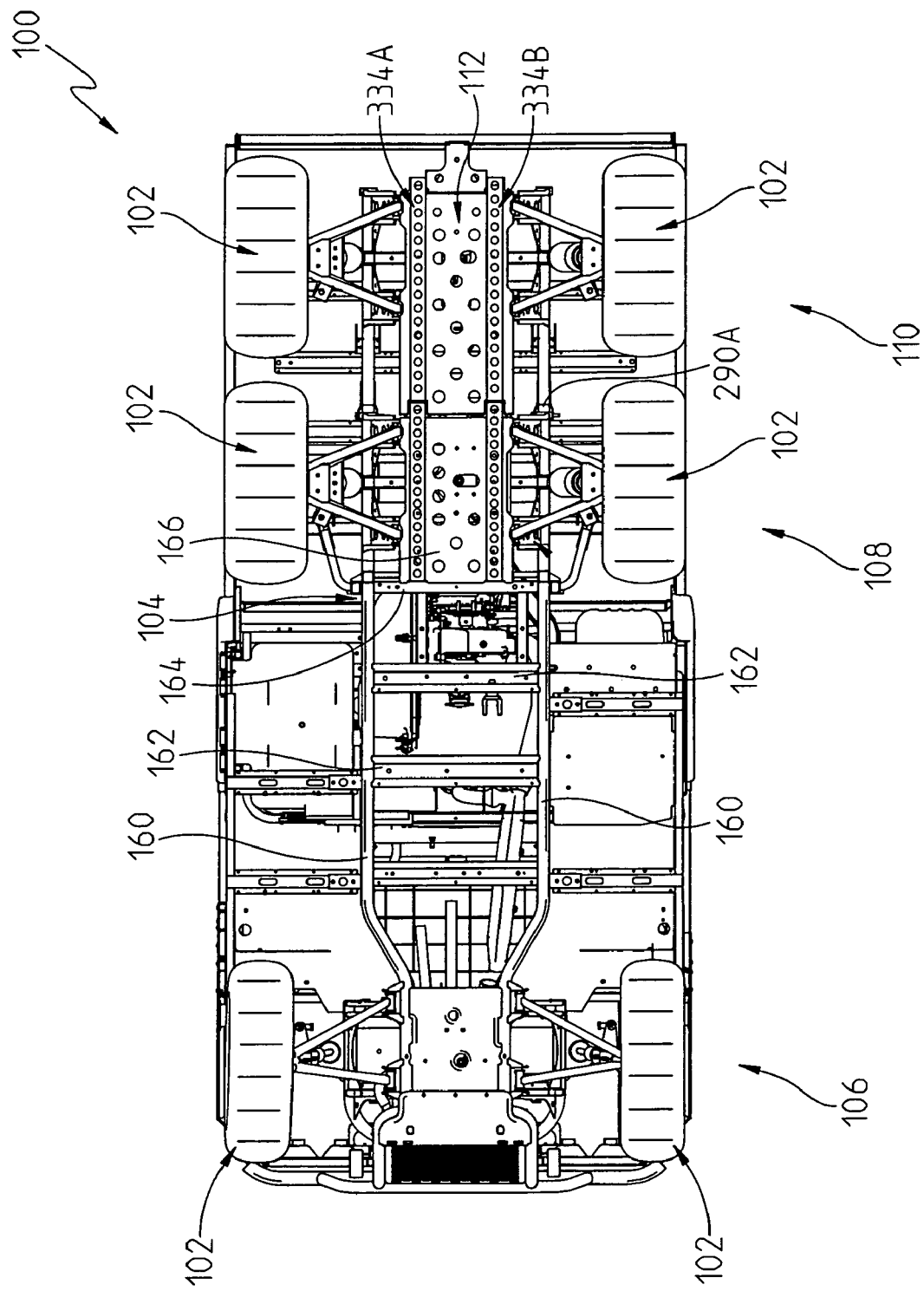
FIG. 7 is a bottom view of the vehicle FIG. 1.
Figure 8:
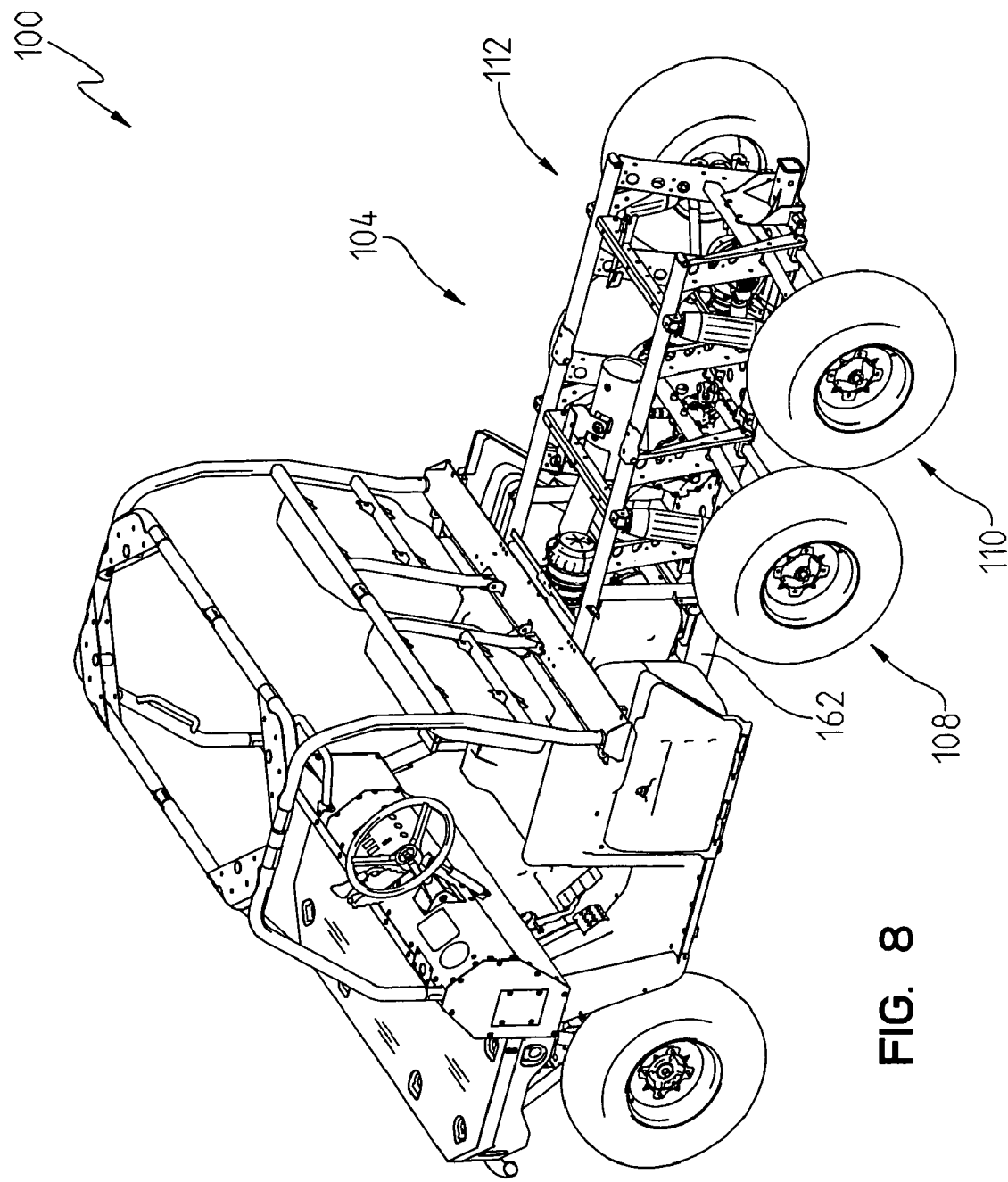
FIG. 8 is a view similar to that of FIG. 1 showing the vehicle with the cargo box removed.
Figure 9:
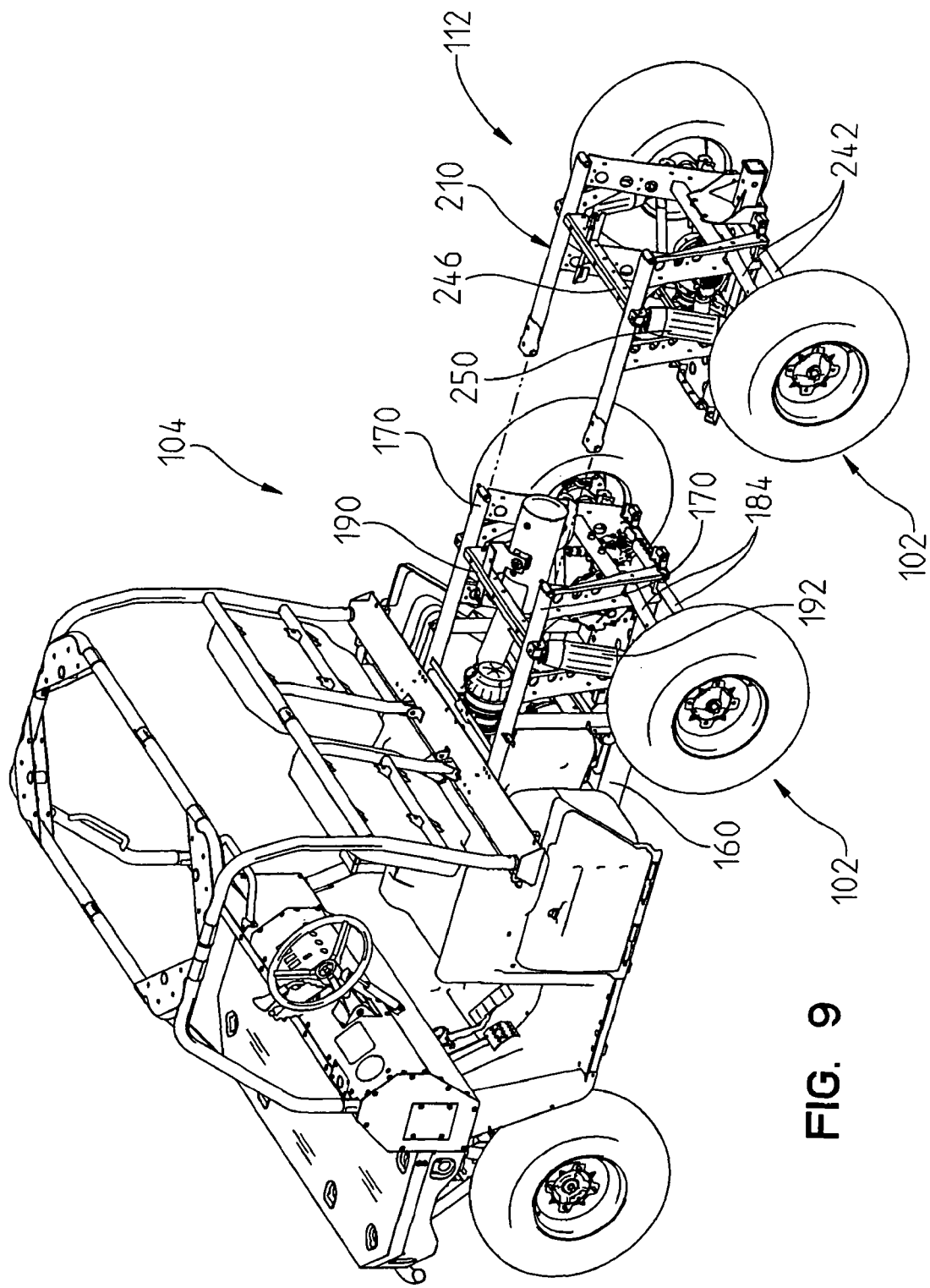
FIG. 9 is a view similar to that of FIG. 8 showing the modular subassembly in an exploded fashion from the remaining portion of the vehicle.
Figure 10:
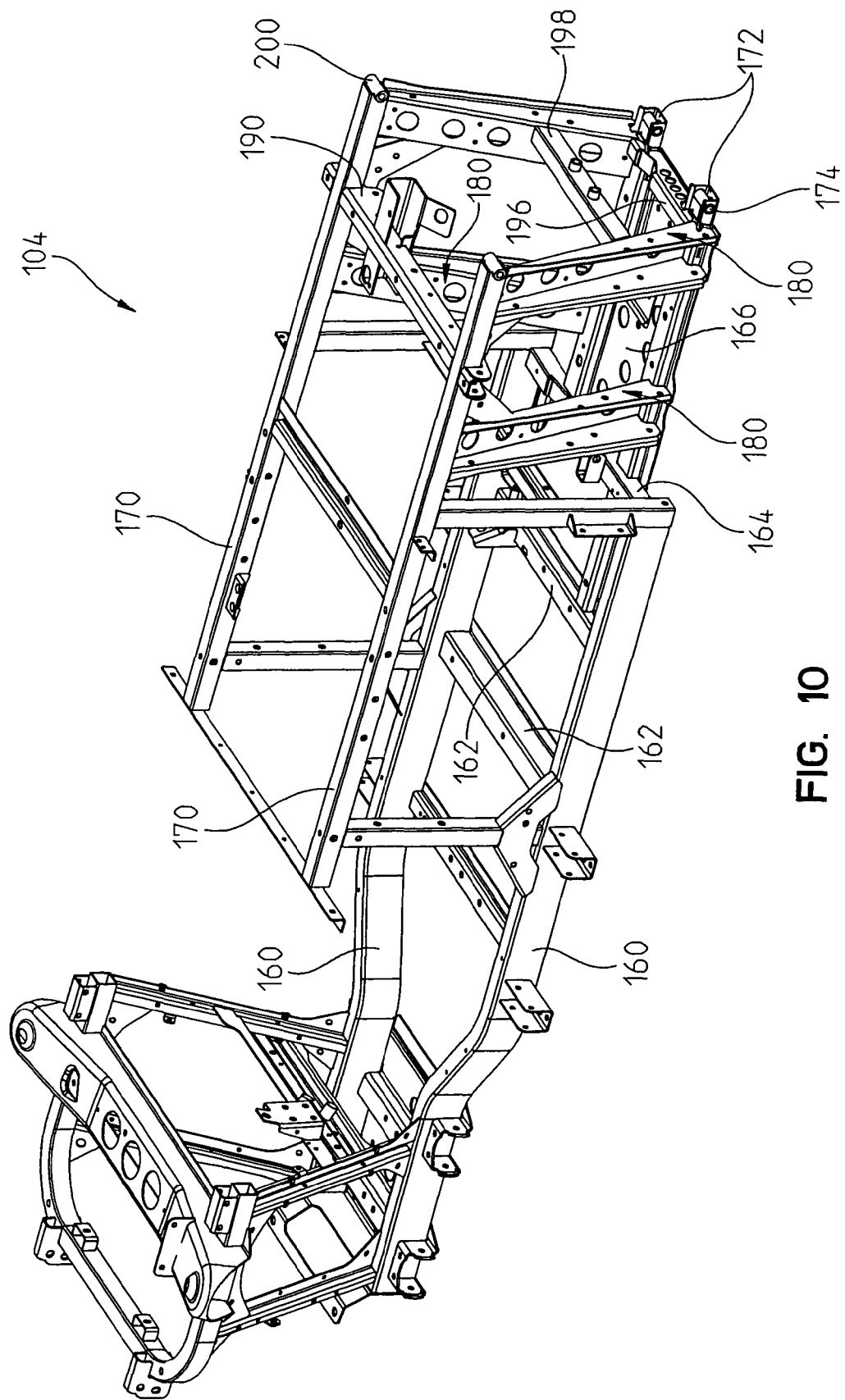
FIG. 10 is a rear perspective view of the frame of the vehicle of FIG. 1.

With reference first to FIGS. 7, 8, and 10, frame 104 is comprised of rearwardly extending support members 160 including a plurality of cross support members such as 162 and a cross support member 164 which supports a support platform 166. As shown best in FIGS. 9-11, frame 104 further comprises upper supports 170. With respect to FIG. 10, support platform 166 includes two elongate inverted channels 172 which extend rearwardly to form attachment points 174 as described further herein. It should be appreciated that the support platform would include an overlay material 176 (FIG. 11) such as a structural steel or aluminum material to provide support and connectability for various drive components. FIGS. 9 and 10 also show upright supports 180 in the form of channels which include opposing channel walls 182 (FIG. 11) which form supports for straddling suspension arms 184 as shown best in FIG. 9. Frame 104 further comprises an upper cross tube 190 which forms attachment points for shock absorbers 192 (FIG. 9). Frame 104 also includes a lower cross tube 196 and a mid cross tube 198. Finally, frame 104 includes rear attachment sections 200 provided at a rear end of upper supports 170.

Figure 11:
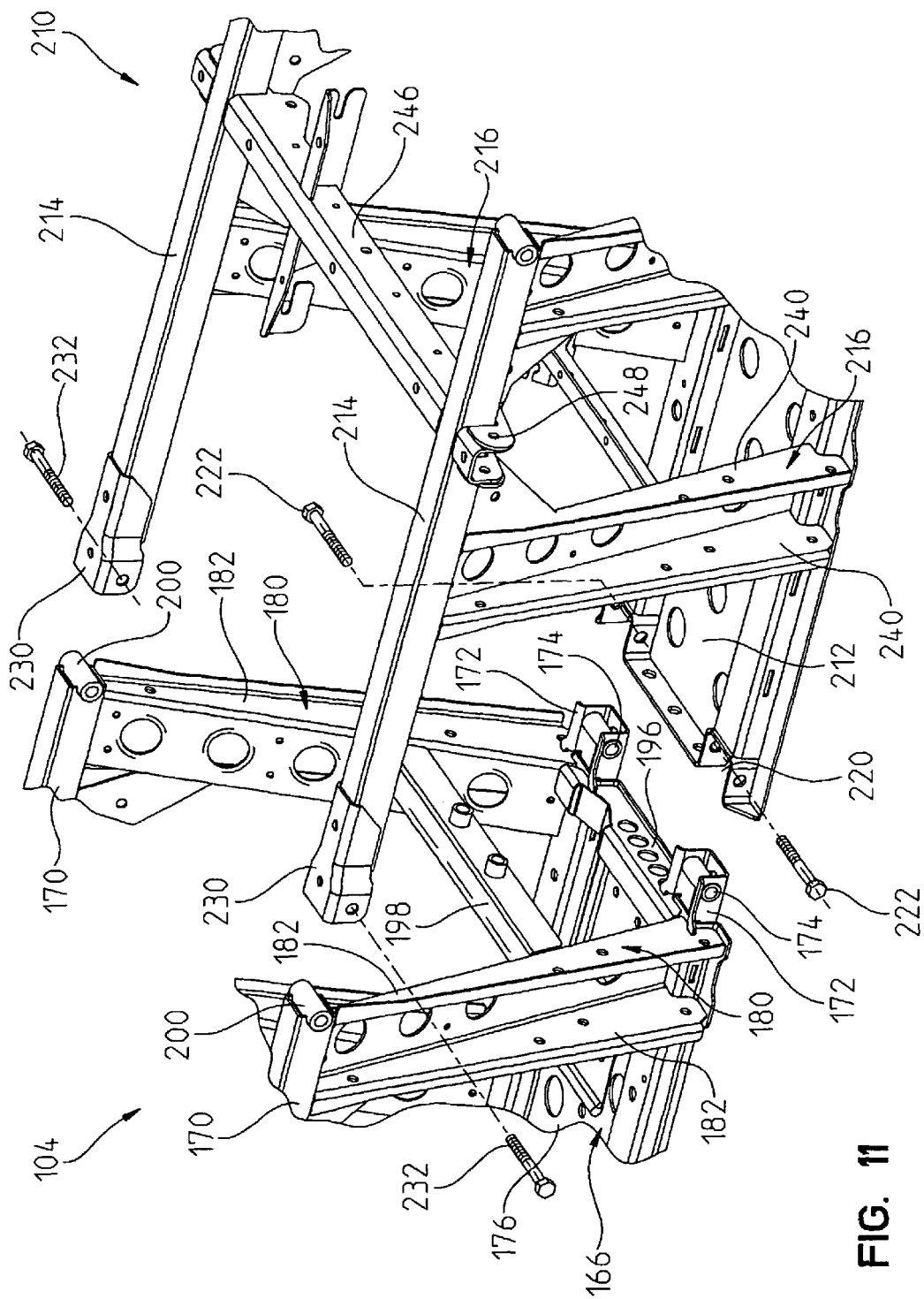
FIG. 11 shows a rear portion of the frame from FIG. 10 with a portion of the rear subassembly.
Figure 12:
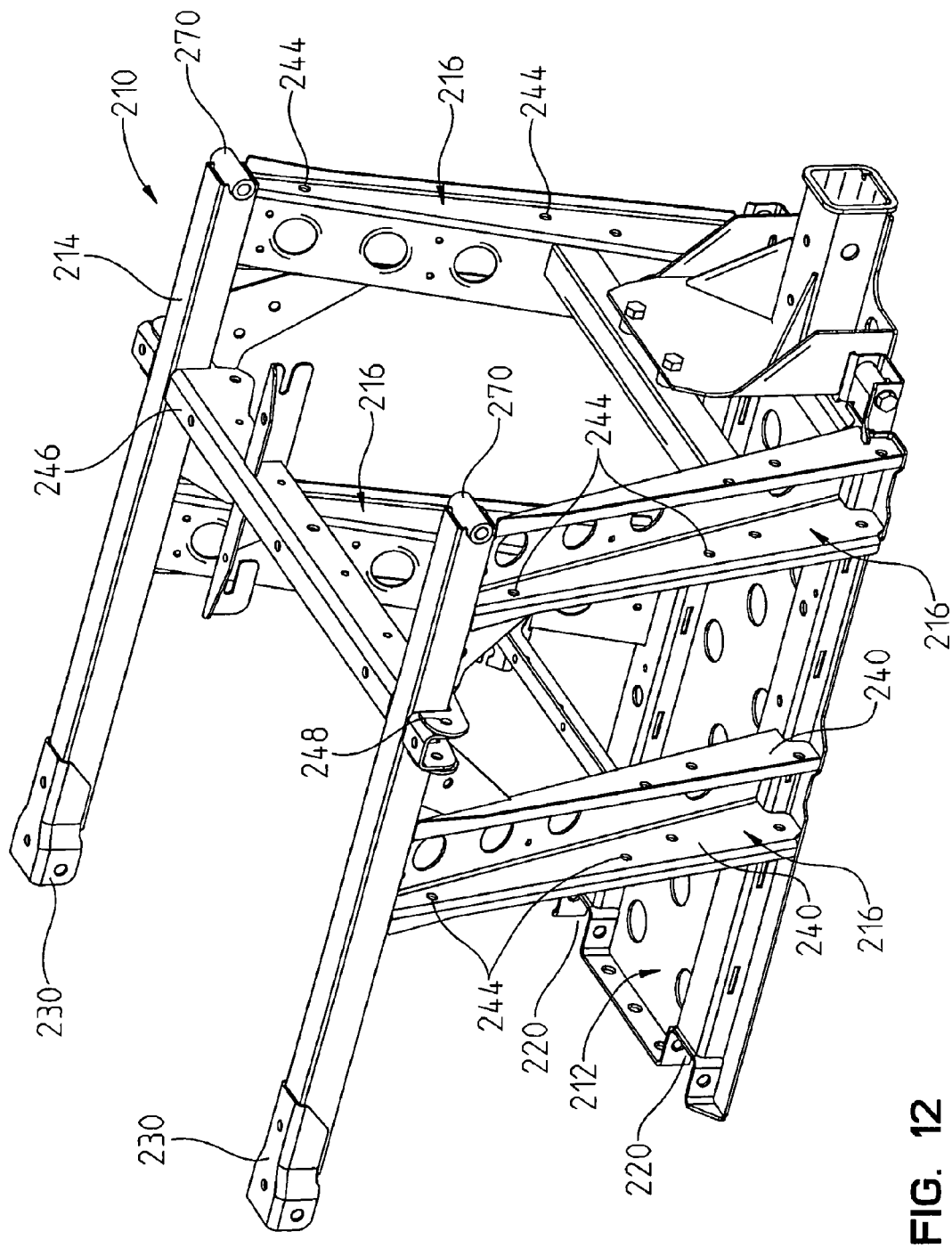
FIG. 12 shows a rear perspective view of the subframe of FIG. 11.

As shown best in FIG. 9, modular subsection 112 includes a modular subframe 210 which is similar in construction to frame 104. As shown in FIGS. 11 and 12, modular subframe 210 is comprised of a support platform 212 attached to upper supports 214 through upright supports 216. Support platform 212 includes openings at 220 for receiving therein channel 172 and for receiving therethrough a fastener 222 (FIG. 11) to attach modular subsection 112 to frame 104. In a like manner, upper supports 214 include at a front end thereof attachment joints 230 for attachment to attachment points 200 by way of fasteners 232. Also in a like manner, upright supports 216 are provided in the form of channels having channel walls 240 which are provided to straddle suspension arms 242 (FIG. 9). Subframe 210 further includes a cross tube 246 having attachment points 248 for shock absorbers 250. Furthermore, upper supports 214 define attachment sections 270 (which are substantially similar to attachment points 200) (FIG. 10) for attaching cargo box 150 as described herein.

As described, frame 104 and subframe 210 provide an excellent support and attachment structure for rear platform 150. First, upper supports 170 of frame 104 and upper supports 214 of subframe 210 form a horizontal support platform which can bear the load of the rear platform 150 and its contents. Furthermore, the weight of the rear platform 150 and its contents has adequate support through channels 180, 216 through suspension arms 184, 242; to shock absorbers 192, 250; and through ground engagement members 102.

Figure 13:
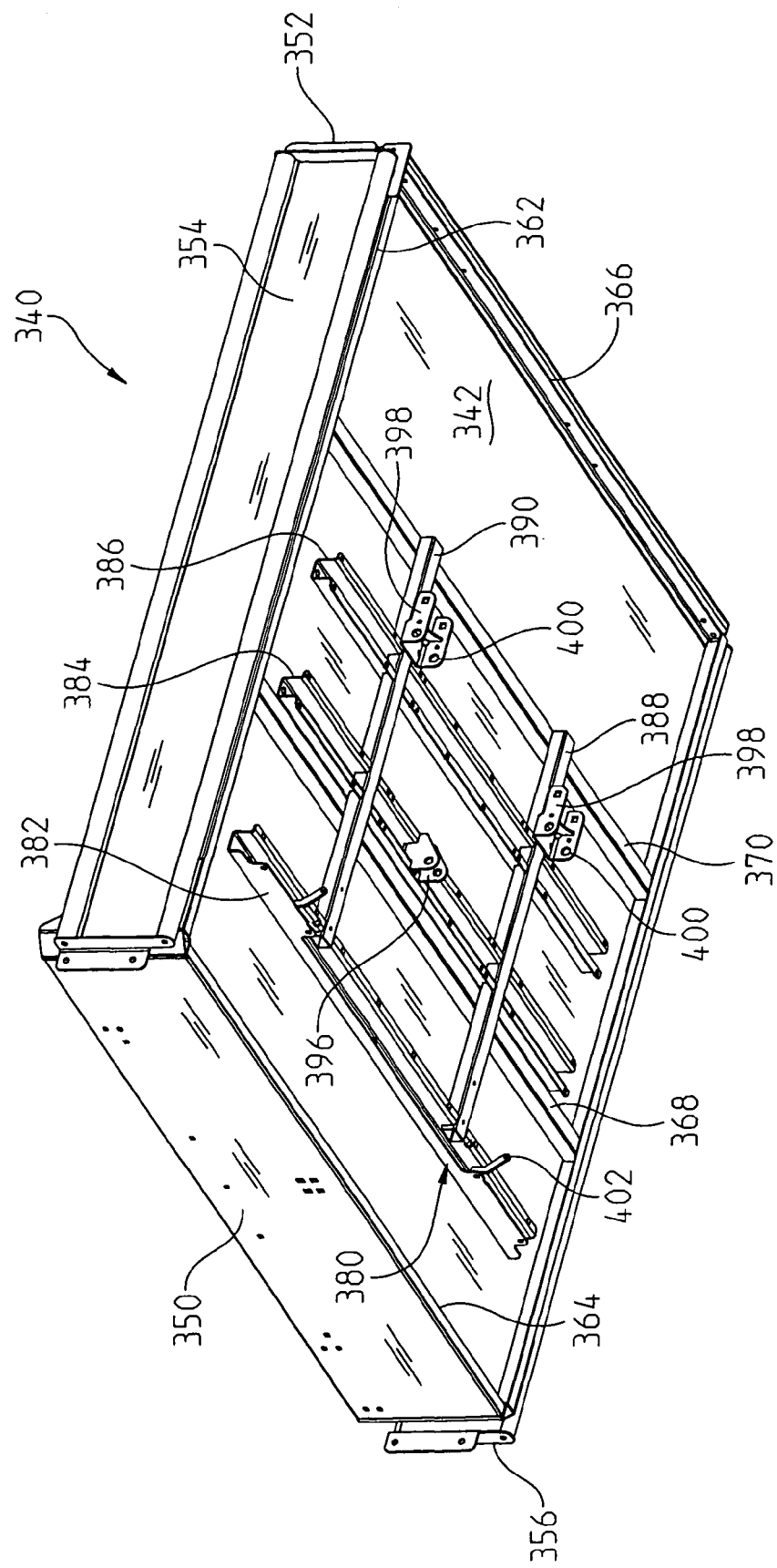
FIG. 13 is an underside perspective view of a cargo box for use with the vehicle of FIG. 1.

With reference now to FIG. 13, one embodiment of a support platform is shown as a cargo box 340. Cargo box 340 includes cargo floor 342, a front end wall 350, rear end wall 352 and side walls 354, 356. Cargo box 340 further includes a frame structure defined by longitudinal supports in the form of rails 360, 362, end supports in the form of rails 364, 366, and lateral supports in the form of rails 368, 370. A cargo box support 380 is attached to the bottom of cargo box 340 and to the lateral supports 368, 370. The cargo box support 380 is comprised of cross channels 382, 384 and 386, and longitudinal rails 388, 390. Cargo box support 380 further comprises a lift cylinder mount 396, and hinges 398 having mounting apertures 400.

The cargo box as configured and shown in FIG. 13 is used in the configuration of a 4-wheeled vehicle, that is where modular subsection 112 is not added. In this case, hinges 398 are attached to attachment points 200 (FIG. 10) by way of pins, such that the cargo box 340 is pivotable about frame 104. A lift cylinder or gas shock can be attached to frame 104 and to lift cylinder mount 396 to assist in lifting a cargo box 340. Latch 402 is also provided within channel 382 and has catches to provide a lock position between the cargo box 340 and frame 104 which prevents pivoting of cargo box 340 about frame 104.

Different alternate cargo boxes may be used depending on the configuration of vehicle 100. In one embodiment, the support platform is one piece and is sufficiently long to cover all of the ground engaging members 102 when modular subsections 102 are added to the vehicle. FIG. 1 shows one embodiment of a one piece cargo box comprising rear platform 150 which is comprised of support surface 152, side walls 154, front end wall 156 and rear end wall 158. The cargo box of rear platform 150 extends over modular subsection 112 when modular subsection 112 is attached to convert a 4-wheeled vehicle 100 to a 6-wheeled vehicle. The cargo box of FIG. 1 is substantially the same as cargo box 340 shown in FIG. 13 except for the increased length. Hinges similar to those described as 398 can be mounted on a similar (longer) cargo box support. The cargo box can be rotatably attached to subframe 210 by pinning the hinges to attachment points 270 on subframe 210.

Figure 14:
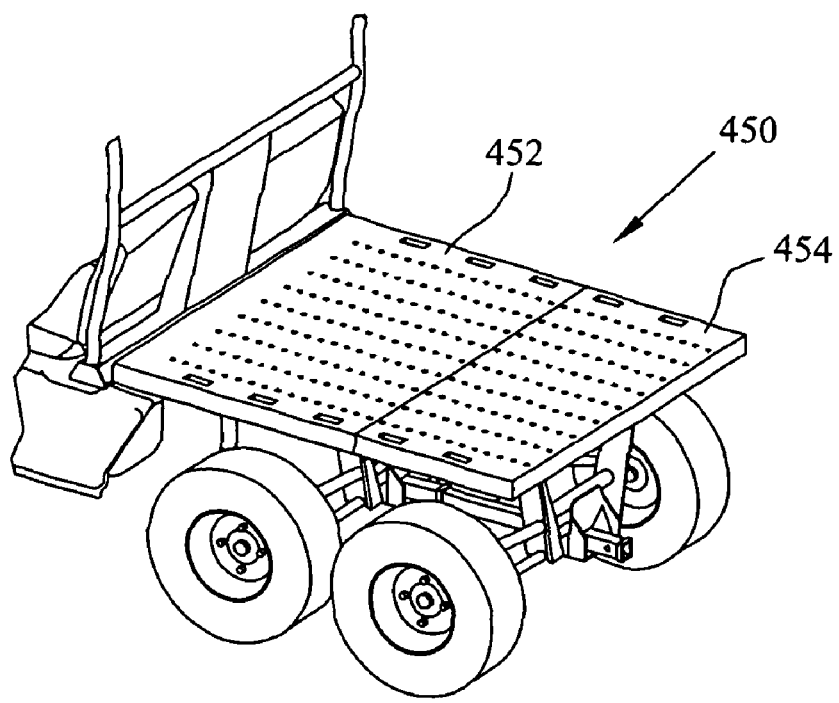
FIG. 14 shows a portion of a two piece cargo box for use with the vehicle of FIG. 1.
Figure 15:
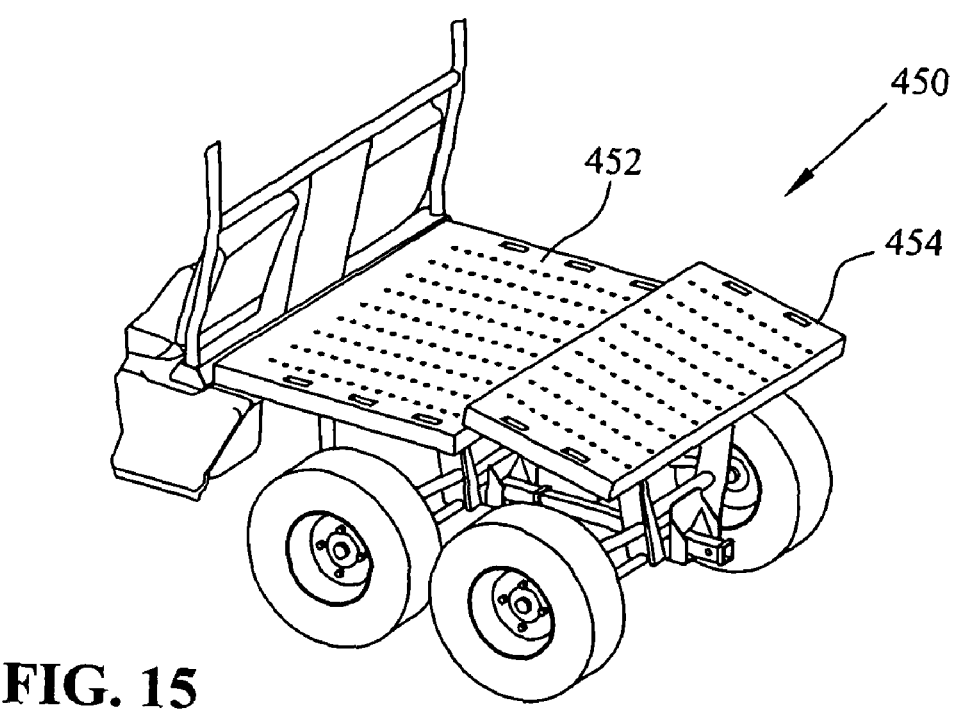
FIG. 15 shows a view similar to that of FIG. 14, with a rear portion of the cargo box in a tilted configuration.
Figure 16:
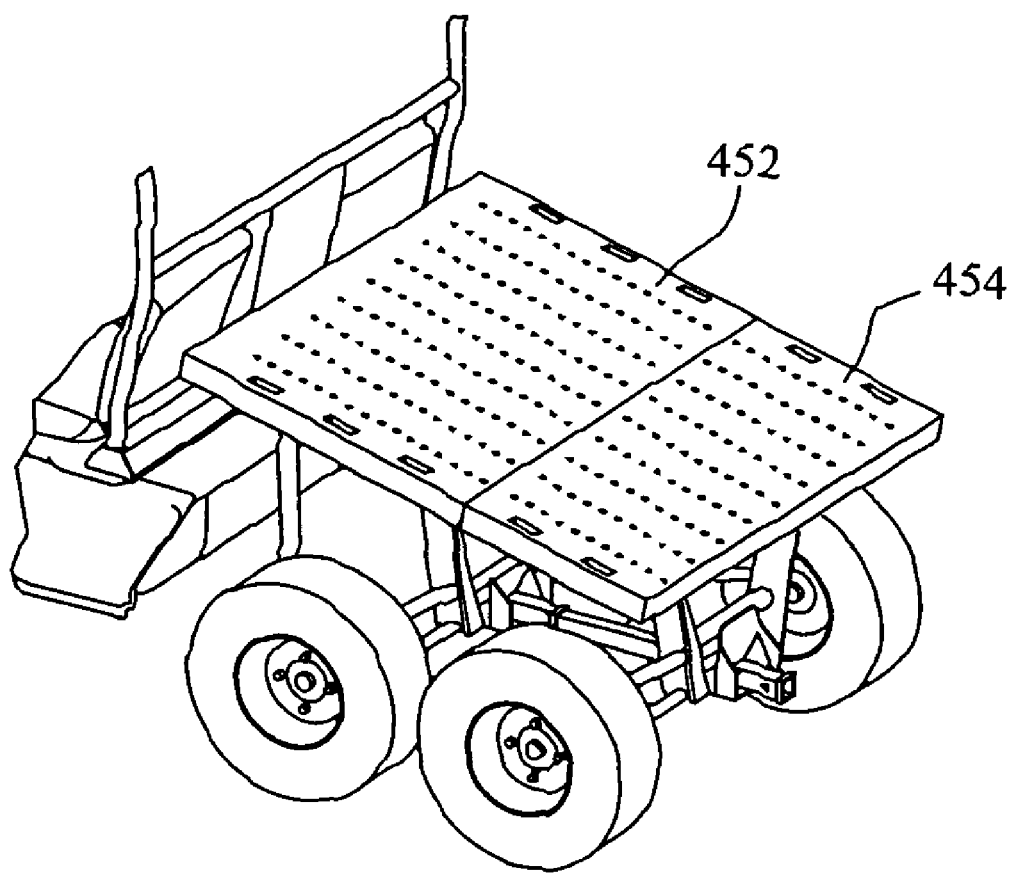
FIG. 16 shows yet another alternate embodiment where the two piece cargo box tilts together.

In other embodiments, multi-piece support platforms are provided. FIGS. 14 and 15 illustrate one embodiment of a two piece support platform 450 comprised of a fixed platform portion 452 and a pivotable platform portion 454. Platform 452 may be fixed to frame 104 whereas pivotable portion 454, comprising hinges similar to hinges 398 and a cargo box support similar to support 380, is rotatably attached to subframe 210 by pinning the hinges to attachment points 270 on subframe 210. In another embodiment, shown in FIG. 16, platforms 452 and 454 each comprise a support similar to support 380 which may be connected to each other such that platform portions 452 and 454 pivot together about attachment points 270.

In any of the support platform configurations, and as shown in FIG. 17, the platform could comprise a plurality of apertures such as 460. Apertures 460 are similar to the mounting apertures described in U.S. Pat. No. 7,055,454, and are commercially available from Polaris Industries Inc. as the "Lock & Ride" system. FIG. 18 shows an accessory personnel support in the form of a chairs 470 comprising a platform 472 which supports seat bottom 474 and seat back 476. Seat bottom 474 may include lap seatbelt portion 478 whereas seat back 476 may include shoulder harness portion 480 such that a four-point seatbelt is provided on each individual chair 470. As shown in FIG. 19, support 472 may include a plurality of expansion retainers 490 which are substantially similar to those shown in U.S. Pat. No. 7,055,454, again available from Polaris Industries Inc. as the "Lock & Ride" system. It should be appreciated that apertures 460 are profiled in a defined matrix such that a plurality of chairs 470 may be positioned either laterally or longitudinally, either facing forward, sideways or rearward, and chairs 470 are easily and removably attachable to apertures 460 by way of the expansion retainers 490.

Figure 20:
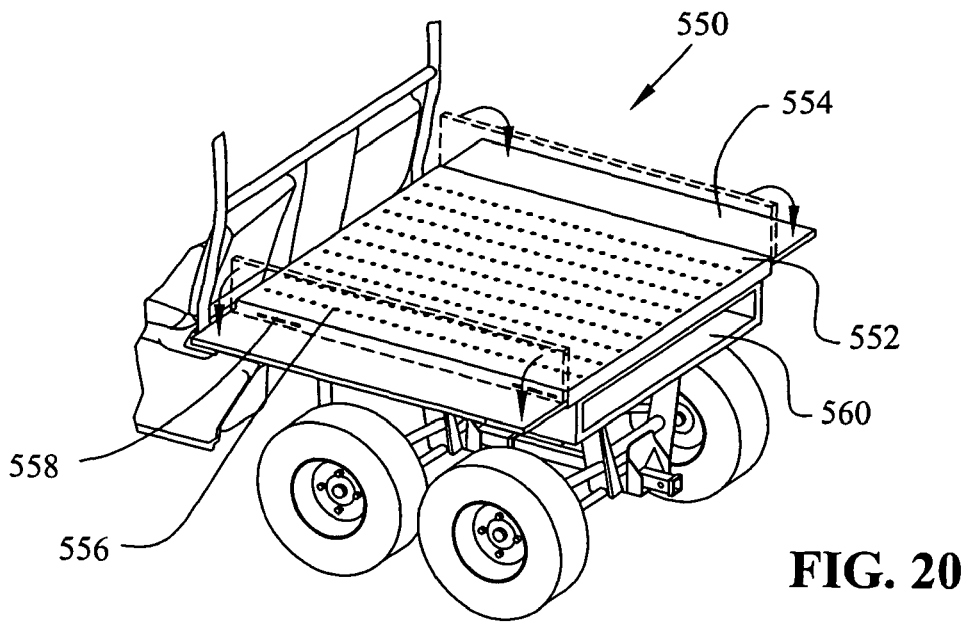
FIG. 20 shows yet another embodiment of a cargo box for use with the vehicle of FIG. 1.
Figure 21:
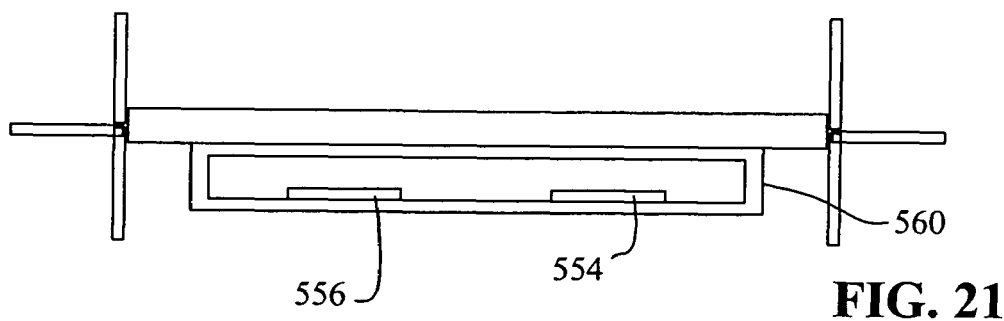
FIG. 21 shows an end view of the cargo box of FIG. 20 with underneath storage for the side panels.
Figure 22:
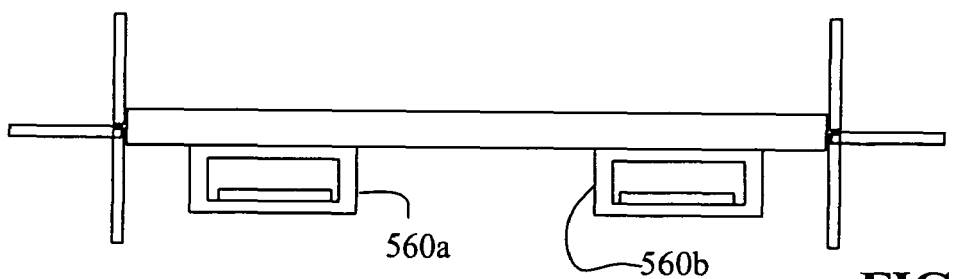
FIG. 22 shows an alternate embodiment of the FIG. 21 cargo box.
Figure 23:
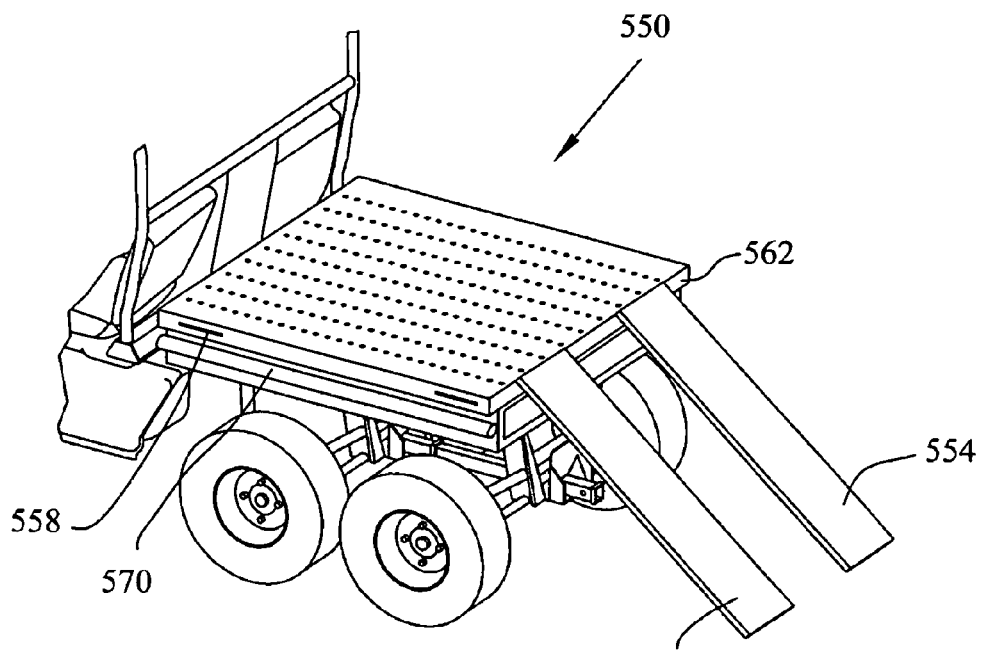
FIG. 23 shows the side panels as used for loading ramps.
Figure 24:
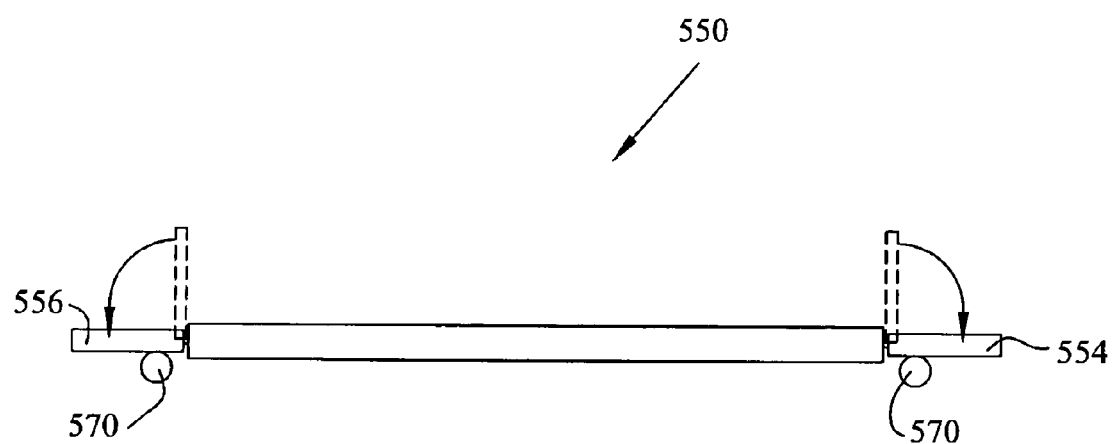
FIG. 24 shows an end view of the embodiment of FIG. 23 with the side panels in alternate orientations.

With respect now to FIGS. 20-21, another embodiment of a support platform is shown at 550 including a platform floor 552 and having side panels 554 and 556. The panels are attached to the platform by way of hinges 558 allowing the side panels 554, 556 to be positioned in multiple orientations. Support platform 550 can also include a storage area 560 which can receive the side panels 554, 556 for carrying purposes. FIG. 22 shows an alternate version of the FIG. 21 embodiment having individual storage areas 560a, 560b. As shown in FIG. 23, the side panels 554, 556 can also have latches on a rear edge 562 where side rails 554, 556 can be used for loading ramps. With reference still to FIG. 23, support platform 550 can include a longitudinally extending outer bumper rail 570 which can be used as a support for the side platforms 554, 556, as shown in FIG. 24, to extend the width of the platform.

With respect now to FIG. 25, a support platform 650 is shown having a plurality of rails 652, and a plurality of apertures similar to apertures 460 as shown in FIG. 17. Each of the rails 652 would include a slotted rail portion 654 as shown in FIG. 26 and an expansion retainer 656 similar to expansion retainer 490 shown and described with respect to FIG. 19. Thus, the individual rails 652 could be positioned in the apertures and locked in place. The rail portion 654 includes a slot 660 which could receive a retaining foot 662 of chair 670. Locking bolts or other fasteners can be used to draw the feet tight in their respective slots. As before, chairs 670 could be placed into any configuration or orientation.

With reference now to FIG. 27, another support platform 750 is shown having an integrated slot 752. As shown best in the enlarged view of FIG. 28, slot 752 is shown as an inverted T-slot comprised of an enlarged slot portion 754 and a narrowed slot portion 756. Furthermore, slot 756 could include multiple apertures of any configuration such as 758 (FIG. 29) along a longitudinal position so as to receive a foot 760 therein in a locking configuration. It should be appreciated that a plurality of apertures 758 which would be provided such that all feet portions 760 would be insertable into the slot 754 and thereafter slideable within the slot to the desired location.

Still alternatively, and with reference to FIG. 30, a support platform 850 could be used where integrated rail portions 852 are embedded in or encapsulated within the platform portion 854. The embedded rail portions 852 define a slot 856 for receiving chair feet similar to that shown in FIGS. 25 and 27.

Figure 31:
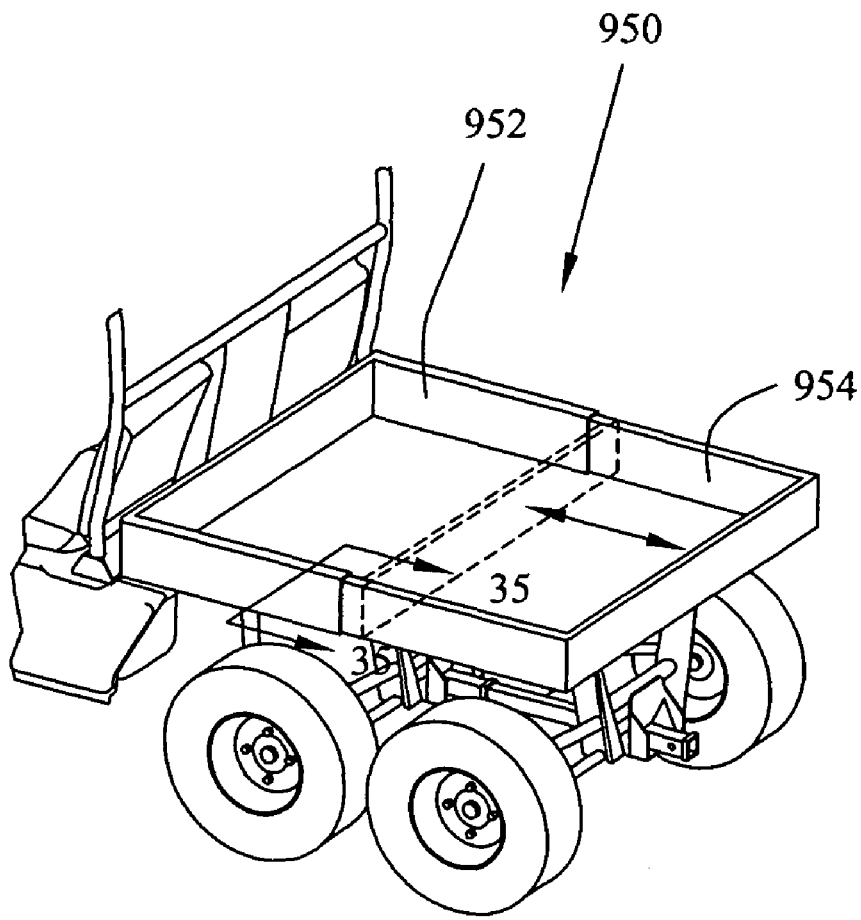
FIG. 31 shows an alternate expandable cargo box.
Figure 32:
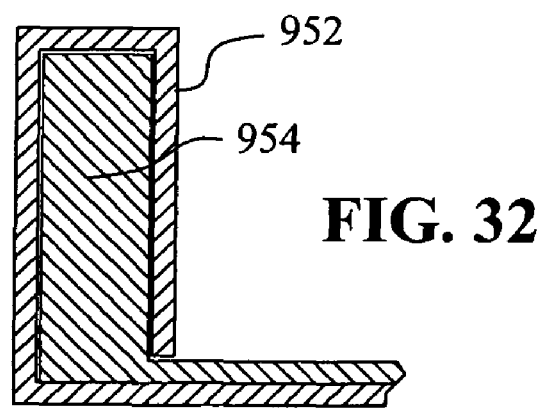
FIG. 32 shows a cross-sectional view through lines 35-35 of FIG. 31.
Figure 33:
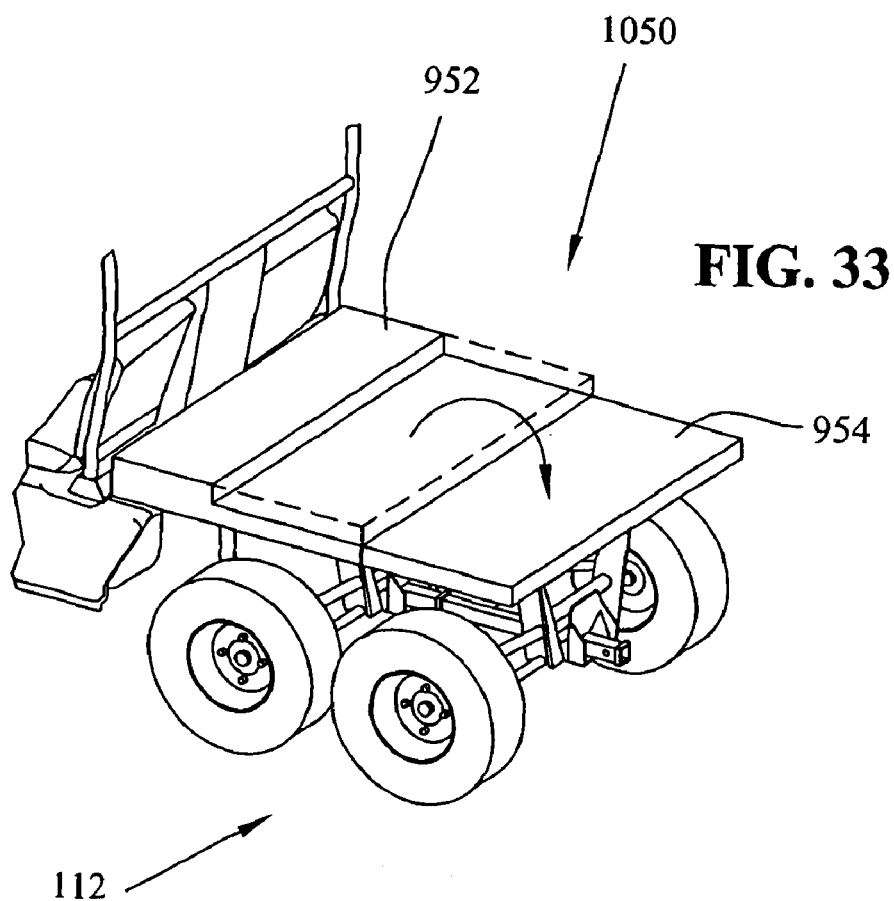
FIG. 33 shows an alternate cargo box floor with a pull down rear portion.

FIG. 31 shows another embodiment of a modular cargo box provided as a cargo box 950 having a forward portion 952 and rearward portion 954, where the sidewall portions are overlapping in a telescopic fashion as shown in FIG. 32. FIG. 33 shows another embodiment of a modular cargo box provided as a cargo box 1050 including a forward portion 1052 and a pivotable second portion 1054. Portion 1054 is pivotally hinged along a rear edge of portion 1052 and, when modular subsection 112 is not used, portion 1054 would be rotated to the position shown in phantom in FIG. 33. However, when modular subsection 112 is used, that is when the vehicle is in a 6-wheeled configuration, portion 1054 is rotated in the direction of the arrow of FIG. 33 to overlie the modular subsection 112.

Figure 34:
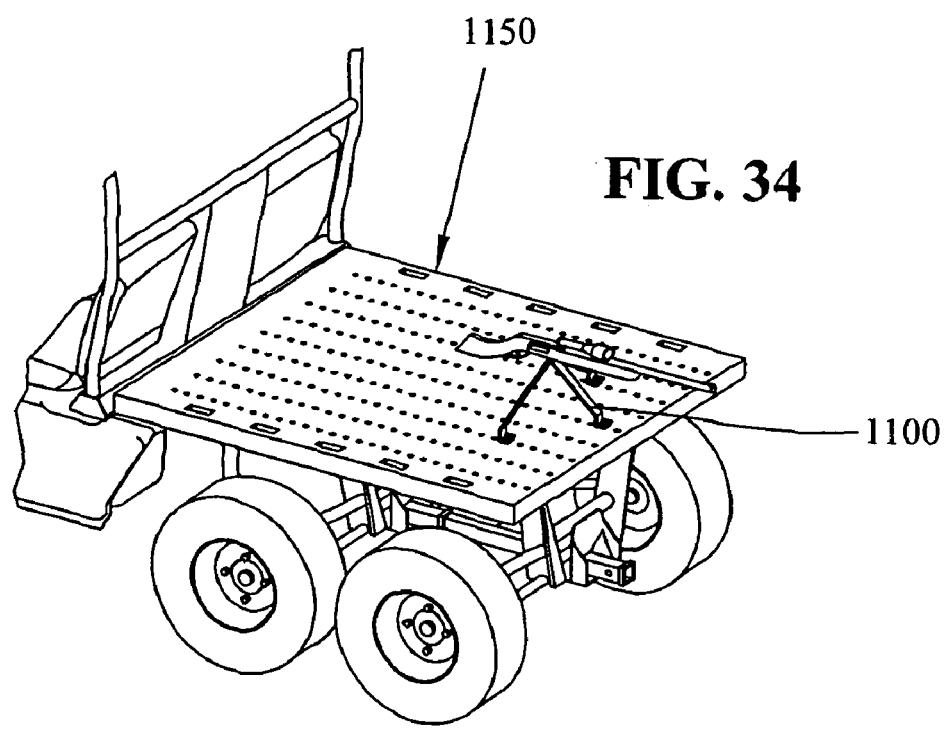
FIG. 34 shows the cargo box floor apertures for use with a tripod.
Figure 35:
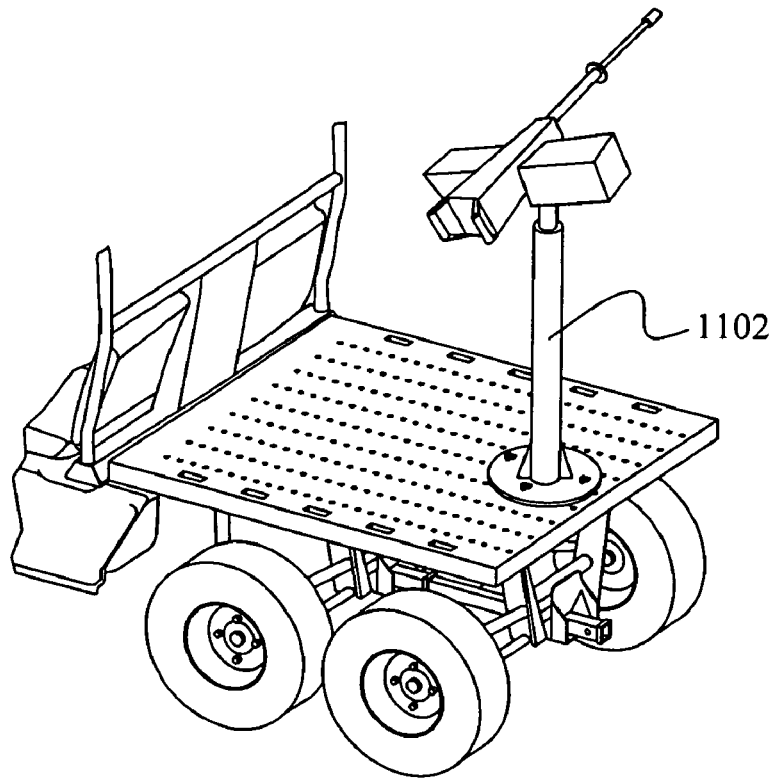
FIG. 35 shows a gun mount for mounting in the apertures of the cargo box floor.
Figure 36:
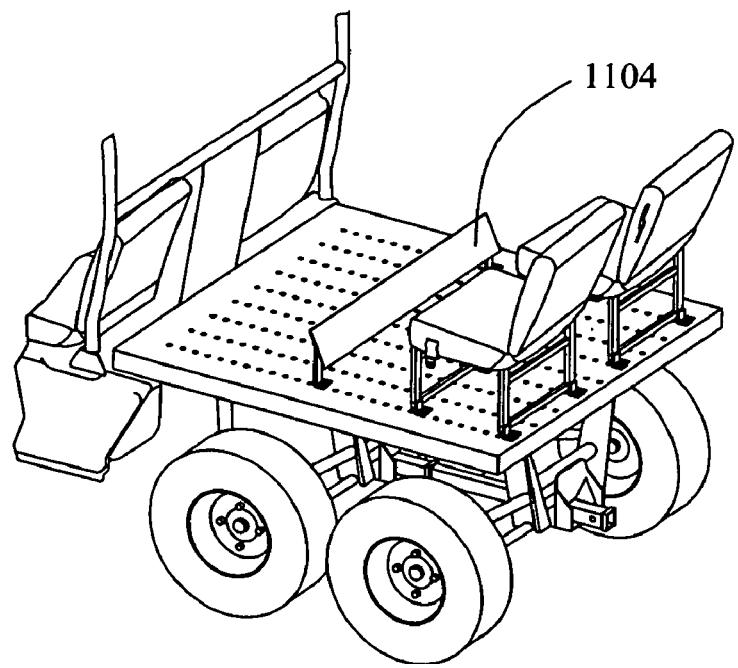
FIG. 36 shows an alternate foot rest for use with the seating.

Referring now to FIGS. 34 through 37, multiple accessories can be mounted directly onto the platform 1150 based on the configuration of the platform and the various mounting apertures as provided herein. Accessories that could be mounted to the platform in respective holes, such as holes 460, may include a tripod 1100 as shown in FIG. 34, a gun mount 1102 as shown in 35, and a foot rest 1104 as shown in FIG. 36. Each of these accessories could also comprise an expansion retainer as described above with respect to FIG. 19.

Another accessory, shown in FIG. 37, is a D-ring 1106 comprising a locking ring portion 1108, an expandable bushing 1110 and a cam member 1112. D-ring 1106 could be locked into position in any of the mounting apertures as described above. D-ring 1106 could be useful to provide attachment points for tie downs of various types.

Figure 4:
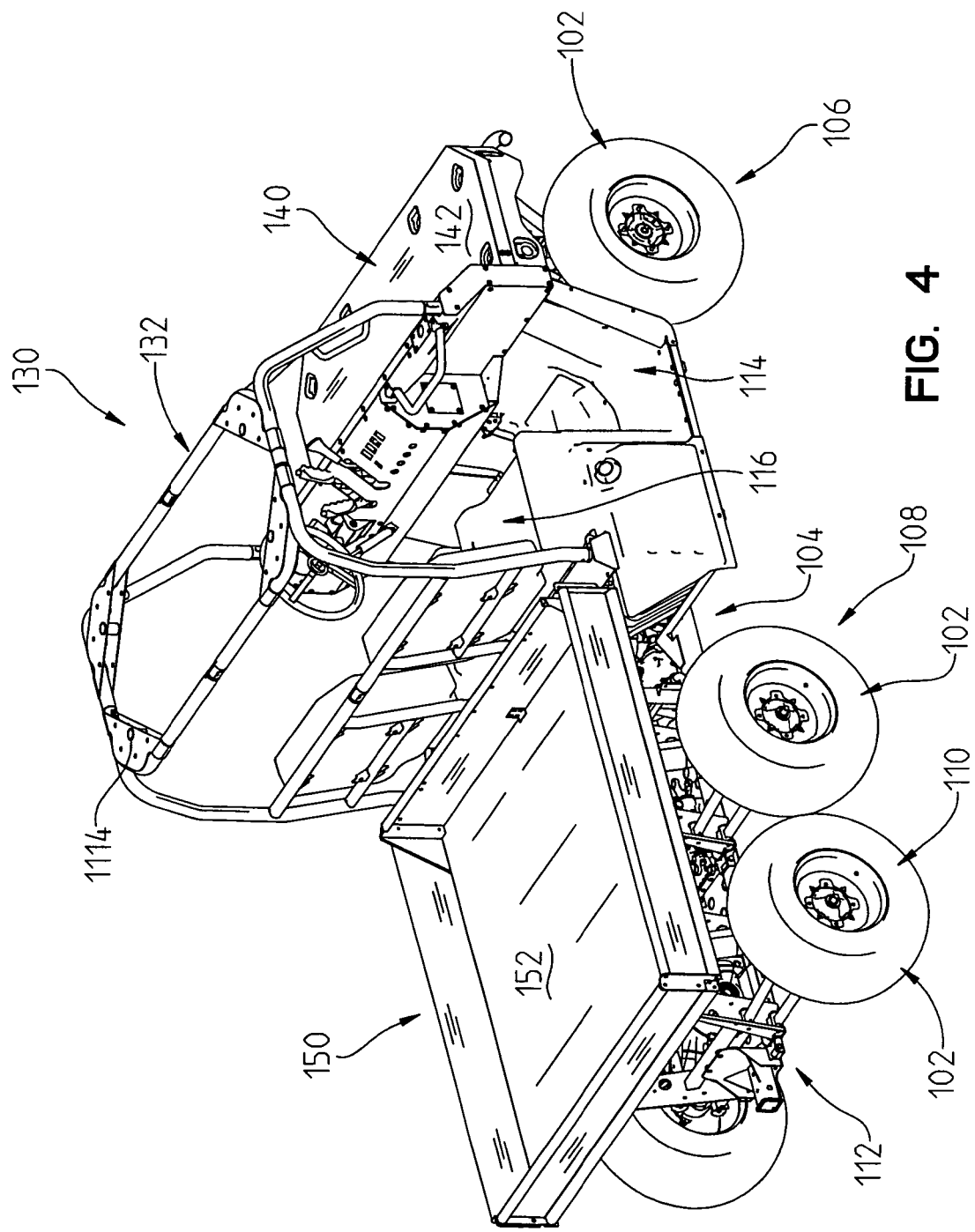
FIG. 4 is a rear, perspective view of the vehicle of FIG. 1 from a second side of the vehicle.
Figure 5:
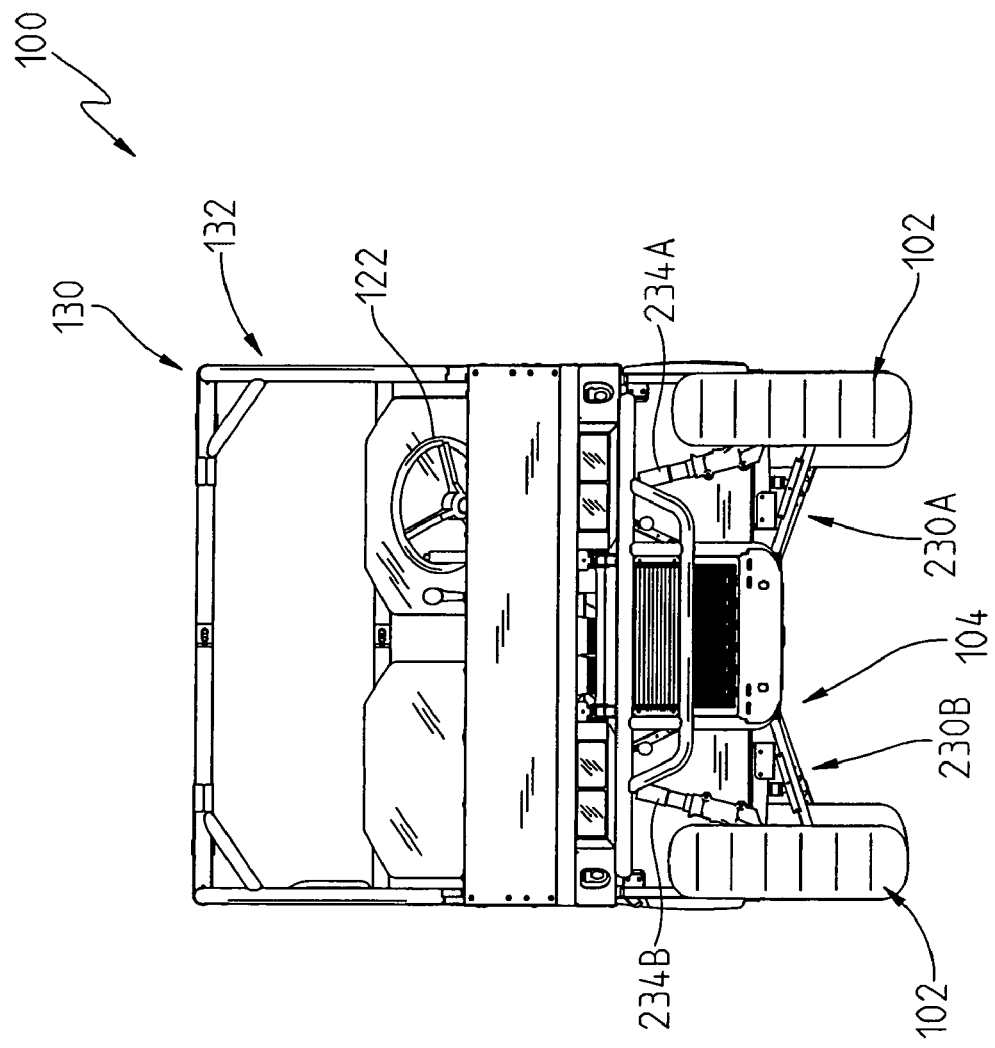
FIG. 5 is a front view of the vehicle of FIG. 1.
Figure 6:
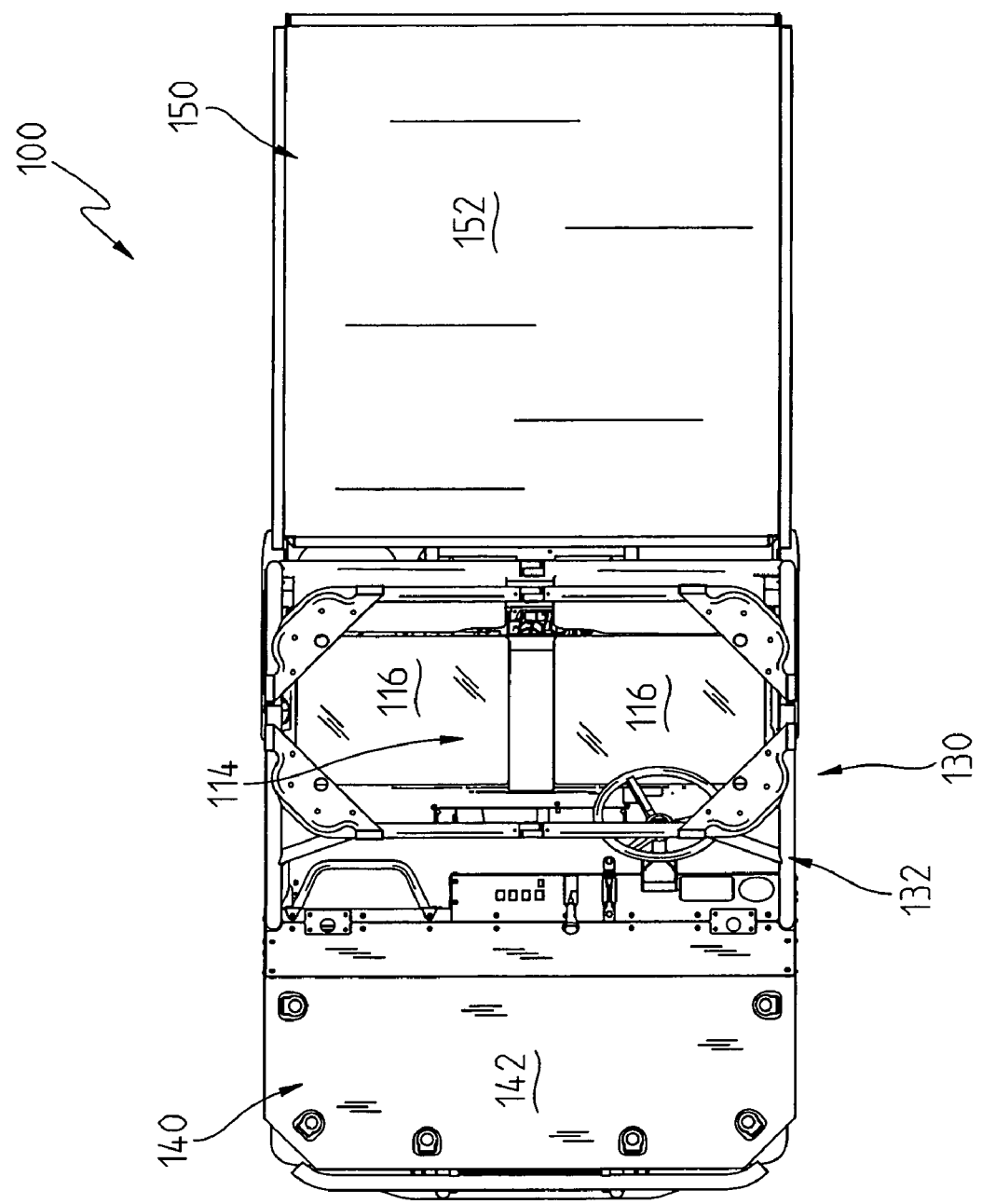
FIG. 6 is a top view of the vehicle of FIG. 1.

Furthermore, while the rear platform may include mounting apertures such as apertures 460, it should also be appreciated that apertures similar to aperture 460 may be provided in multiple locations around the vehicle. For example, the front support platform 140 as well as other locations, such as the roll cage 132 (see item 1114, FIG. 4), the floor boards, and the like, could also include a plurality of mounting apertures similar to 460.

Figure 38:
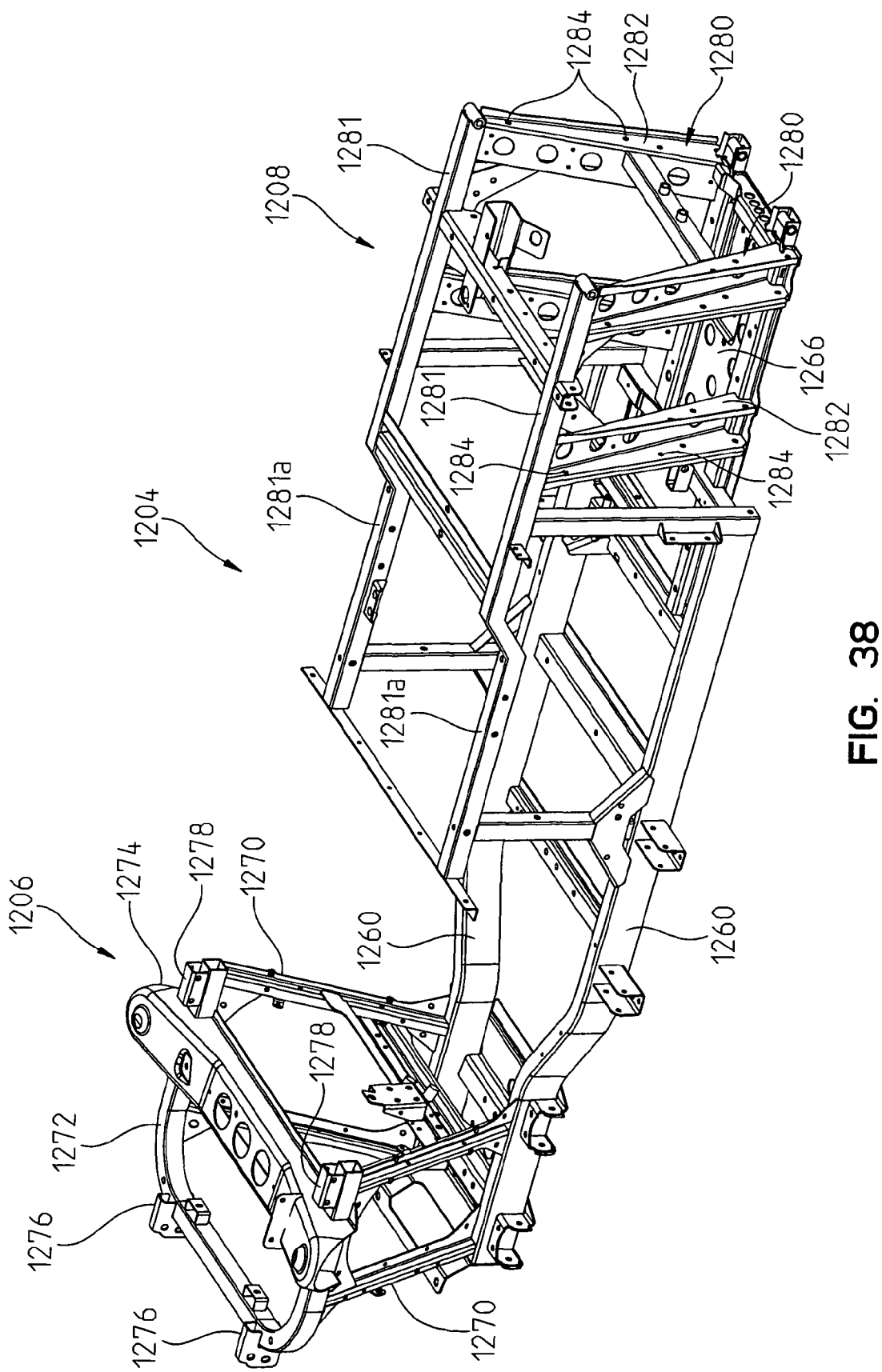
FIG. 38 is an alternate frame similar to that shown in FIG. 10.
Figure 39:
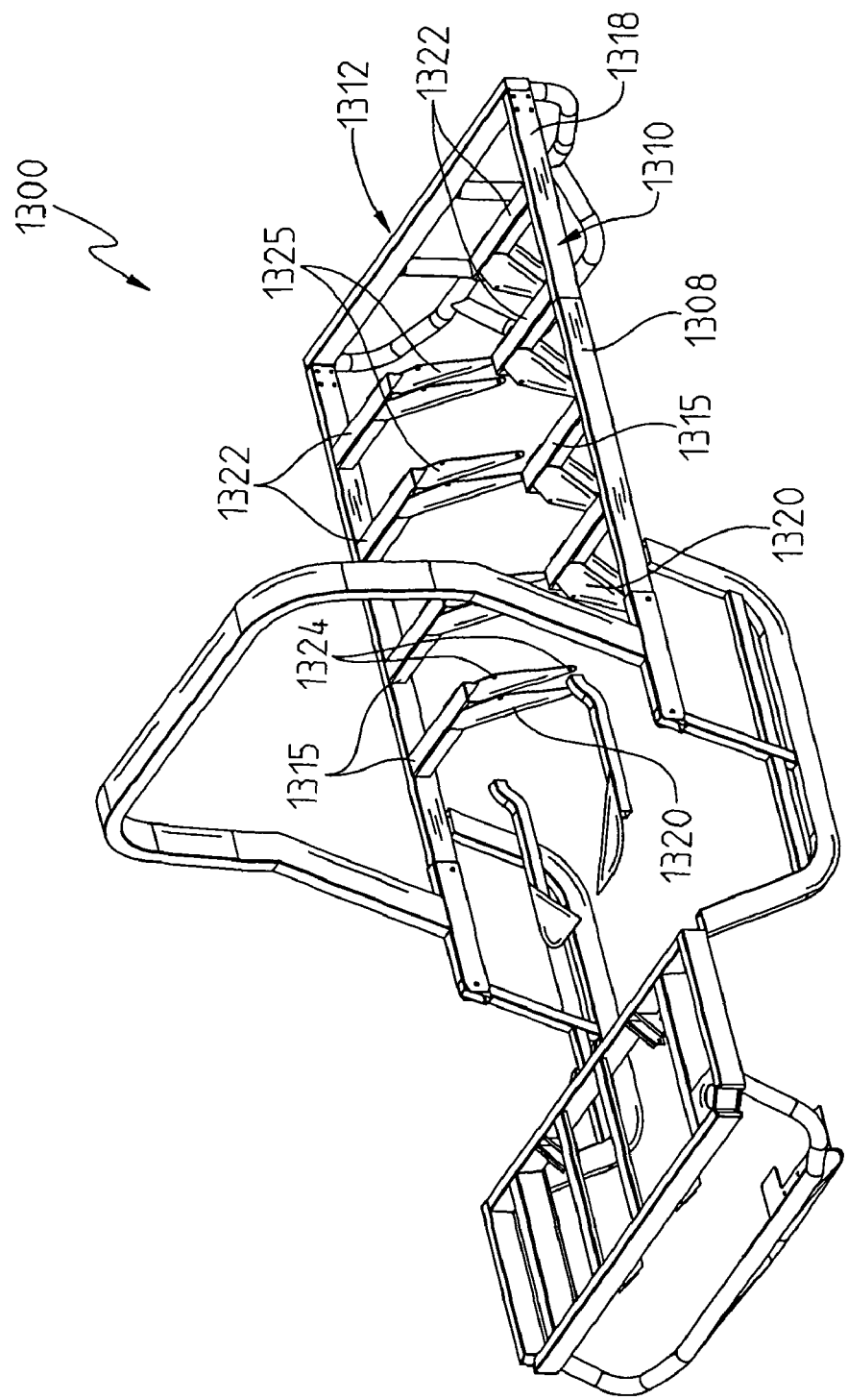
FIG. 39 is a front perspective view of the exoskeletal frame for use with the frame of FIG. 38.
Figure 40:
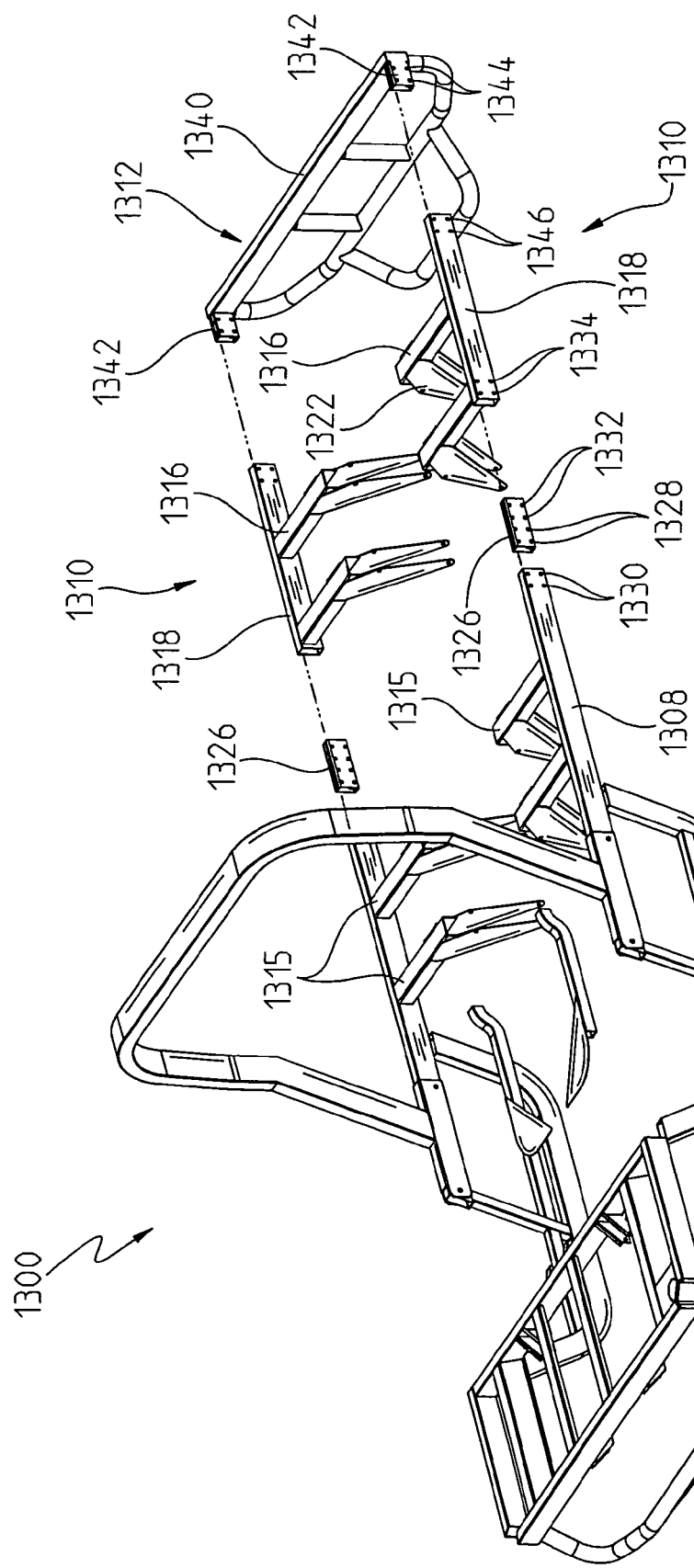
FIG. 40 is a perspective view of the exoskeletal frame of FIG. 39, shown with the rear frame portion in an exploded manner.
Figure 41:
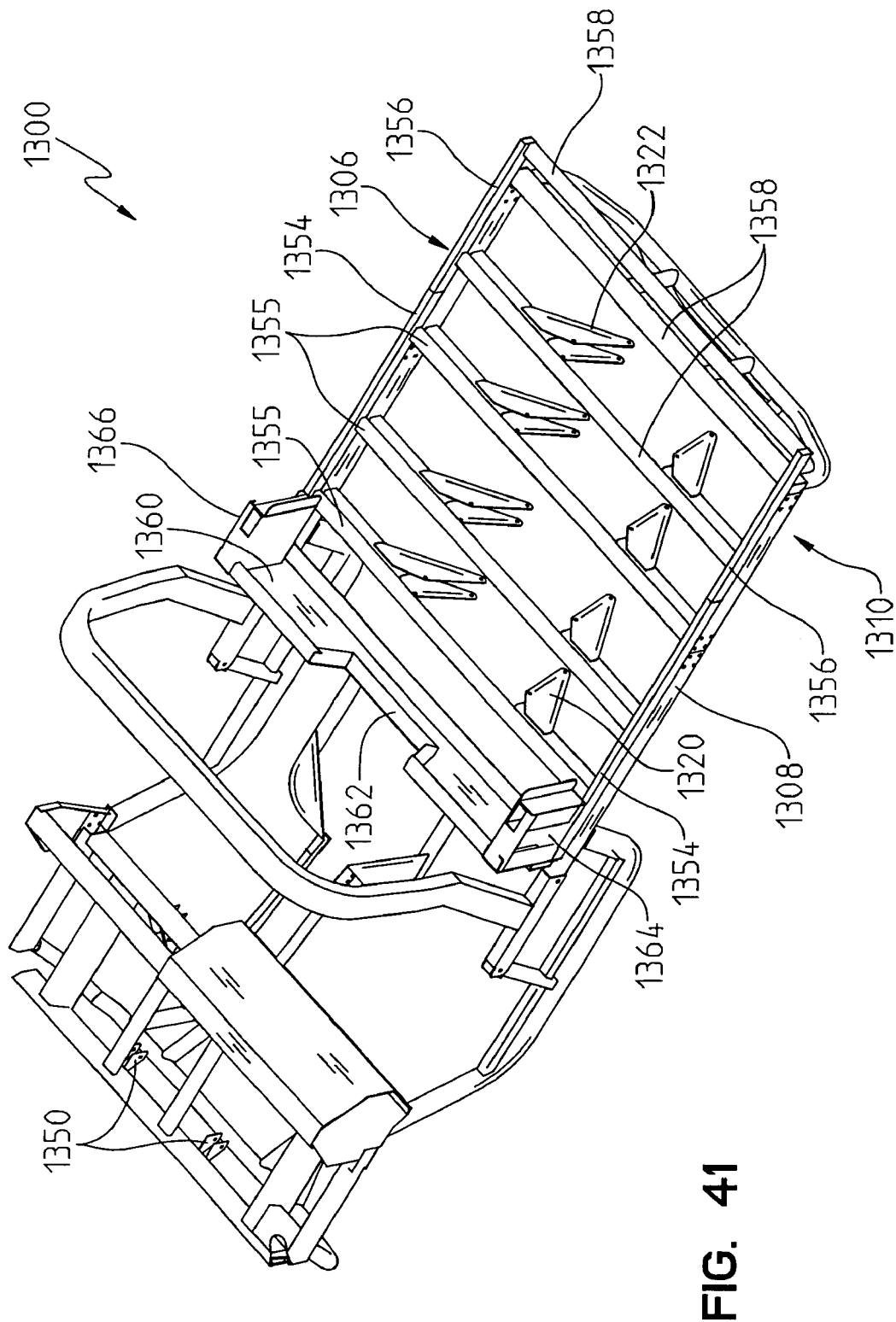
FIG. 41 is a rear perspective view of the frame of FIGS. 39 and 40, showing an alternate rear support in place.

With respect to now to FIGS. 38-41, another vehicle will be described comprising an alternate frame 1204 (FIG. 38) and an exoskeletal frame 1300 (FIGS. 39-41). With respect first to FIG. 38, alternate frame 1204 is substantially similar to frame 104 shown in FIG. 10. Frame 1204 includes a front frame section 1206 and a rear frame section 1208. Front frame section 1206 and rear frame section 1208 are integrated by way of structural frame members 1260. Front frame section 1206 includes upright supports 1270 in the form of channels which extend upwardly from structural frame members 1260 and support a hoop structure 1272. Hoop structure 1272 in turn supports a transverse frame member 1274 and mounting brackets 1276 and 1278.

With respect still to FIG. 38, rear frame section 1208 of frame 1204 includes a support platform 1266 with channel uprights 1280 extending upwardly and attached to frame upper supports 1281. Frame upper supports 1281 are stepped down at 1281a to provide for seat clearance. Each of the channel uprights 1280 include sidewalls 1282 having a plurality of mounting apertures 1284.

Figure 42:
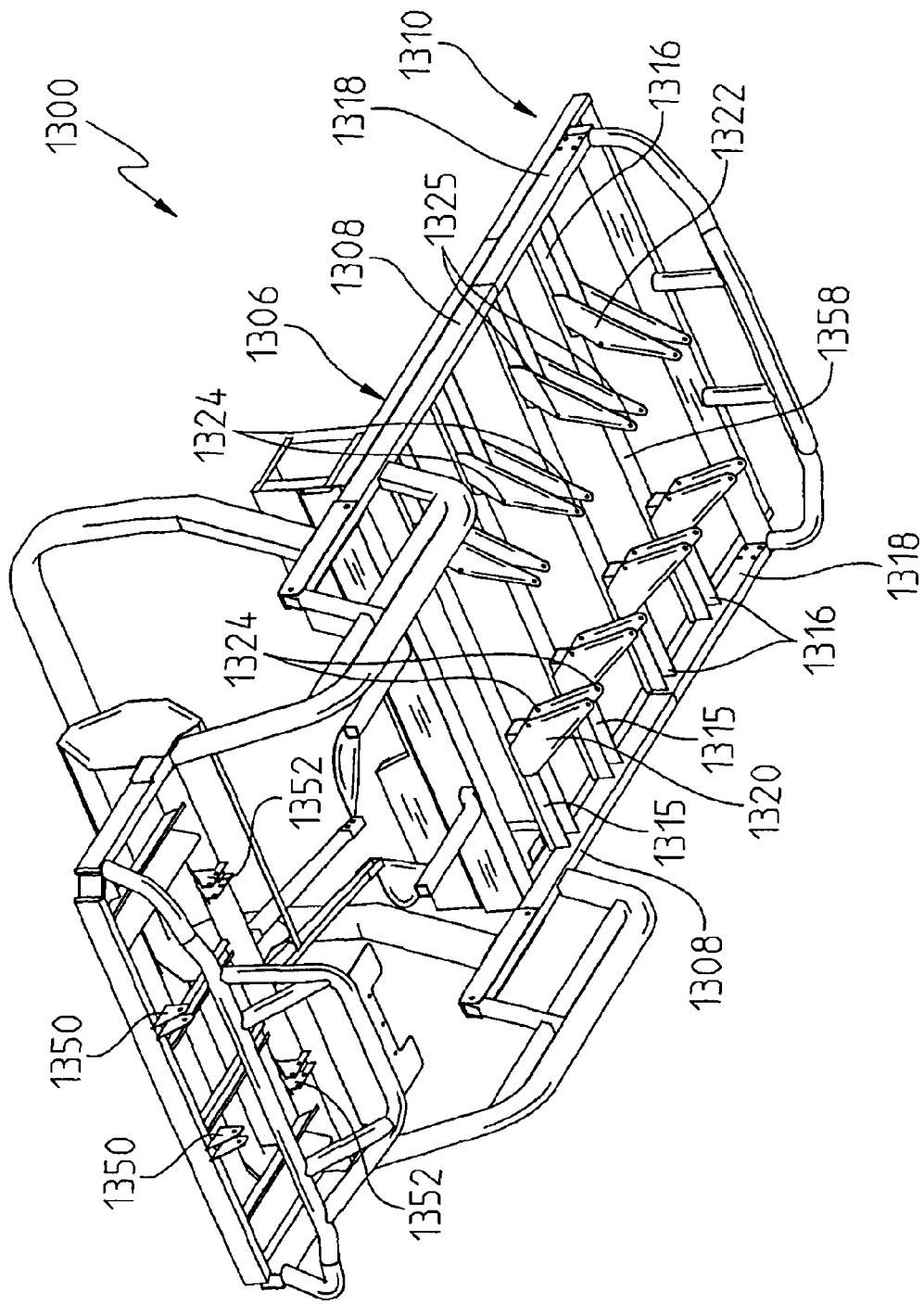
FIG. 42 is an underside perspective view of the frame of FIGS. 38 and 39.

With respect now to FIGS. 39-42, an exoskeletal frame 1300 is shown. FIG. 40 shows an exploded view of FIG. 39. FIGS. 41 and 42 show frame 1300 having an alternate rear support 1306 which is configurable into a cargo box. As described with reference to FIGS. 41 and 42, exoskeletal frame 1300 is attachable to frame 102 and subframe 210. Referring now to FIGS. 39-40, frame 1300 includes rearwardly extending supports 1308 coupled to subframe 1310 by connector blocks 1326, and bumper assembly 1312. A plurality of channels 1315 extend from supports 1308 which in turn support a plurality of support plates 1320. The plurality of support plates 1320 are provided with mounting apertures 1324 adapted for coupling supports 1308 to frame 1204. Supports 1308 are adapted to receive connector blocks 1326.

Subframe 1310 includes supports 1318 coupled to supports 1308 by connector blocks 1326, and a plurality of channels 1316 extending from supports 1318 which in turn support a plurality of support plates 1322. The plurality of support plates 1322 are provided with apertures 1325 adapted for coupling supports 1308 to subframe 210, as further described herein.

Connector blocks 1326 are receivable into the ends of the frames 1308, 1318. In one embodiment, connector blocks 1326 have a first set of tapped holes 1328 which will underlie apertures 1330 in supports 1308, and a second set of tapped holes 1332 which will underlie apertures 1334 in supports 1318. It should be appreciated that fasteners such as bolts are receivable through the apertures 1330, 1334 and are threadably receivable into tapped holes 1328, 1332 respectively, to secure subframe 1310 to frame sections 1308. In another embodiment, holes 1328, 1332 are not tapped and subframe 1310 may be secured to frame sections 1308 by means including pins, and nuts and bolts.

In a similar manner, bumper assembly 1312 includes a frame tube 1340 having integrated connector blocks 1342 which are receivable into the ends of the frames 1318. Connector blocks 1342 have tapped holes 1344 which will underlie apertures 1346 when bumper assembly 1312 is coupled to subframe 1310 and fasteners such as bolts which are receivable through the apertures 1346 and are threadably receivable into tapped holes 1344, to secure bumper assembly 1312 to frame supports 1318.

As shown best in FIGS. 41-42, exoskeletal frame 1300 further includes mounting brackets 1350 and 1352. Exoskeletal frame 1300 is directly attachable over frame 1204 (FIG. 38) by aligning apertures 1324 of plates 1320 (FIG. 39) with apertures 1284 (FIG. 38); by aligning brackets 1350 (FIGS. 41-42) with brackets 1276 (FIG. 38); and by aligning brackets 1352 (FIG. 42) with brackets 1278 (FIG. 38). In a like manner, subframe 1310 is directly attachable over and to subframe 210 (FIG. 12) by aligning apertures 1325 of plates 1322 (FIG. 42) with apertures 244 (FIG. 12).

It should be readily apparent, that the exoskeletal frame 1300 is convertible between a 4×4 and 6×6 configuration, by removing connector blocks 1326 and subframe 1310, and by inserting connector blocks 1342 of bumper assembly 1312 into frame members 1308. That is, hole pattern 1344 is identical to hole pattern 1328, and therefore tapped holes 1344 will underlie apertures 1330, in order to receive fasteners therethrough for connection of the bumper assembly 1312 directly to the frame supports 1308 in the 4×4 configuration. It should also be appreciated, that subframe 1310, as it is attached to subframe 210 (FIG. 12) is removable with subframe 210 as described above.

With respect to FIGS. 41 and 42, frame 1300 may comprise a rear support 1306 comprising a plurality of frame members 1354 and cross members 1355 extending there between. Rear support 1306 may also include frame members 1356 and cross tubes 1358 therebetween. Rear support 1306 further includes a permanently attached front wall 1360 having a recessed area 1362 and further comprises permanently attached lateral stub walls 1364 and 1366, which are attached to frame members 1354. It should also be appreciated that rear support 1306 is configurable into a cargo box and is modular in nature to convert between a 4×4 mode and a 6×6 mode, and vice versa.

Figure 43:
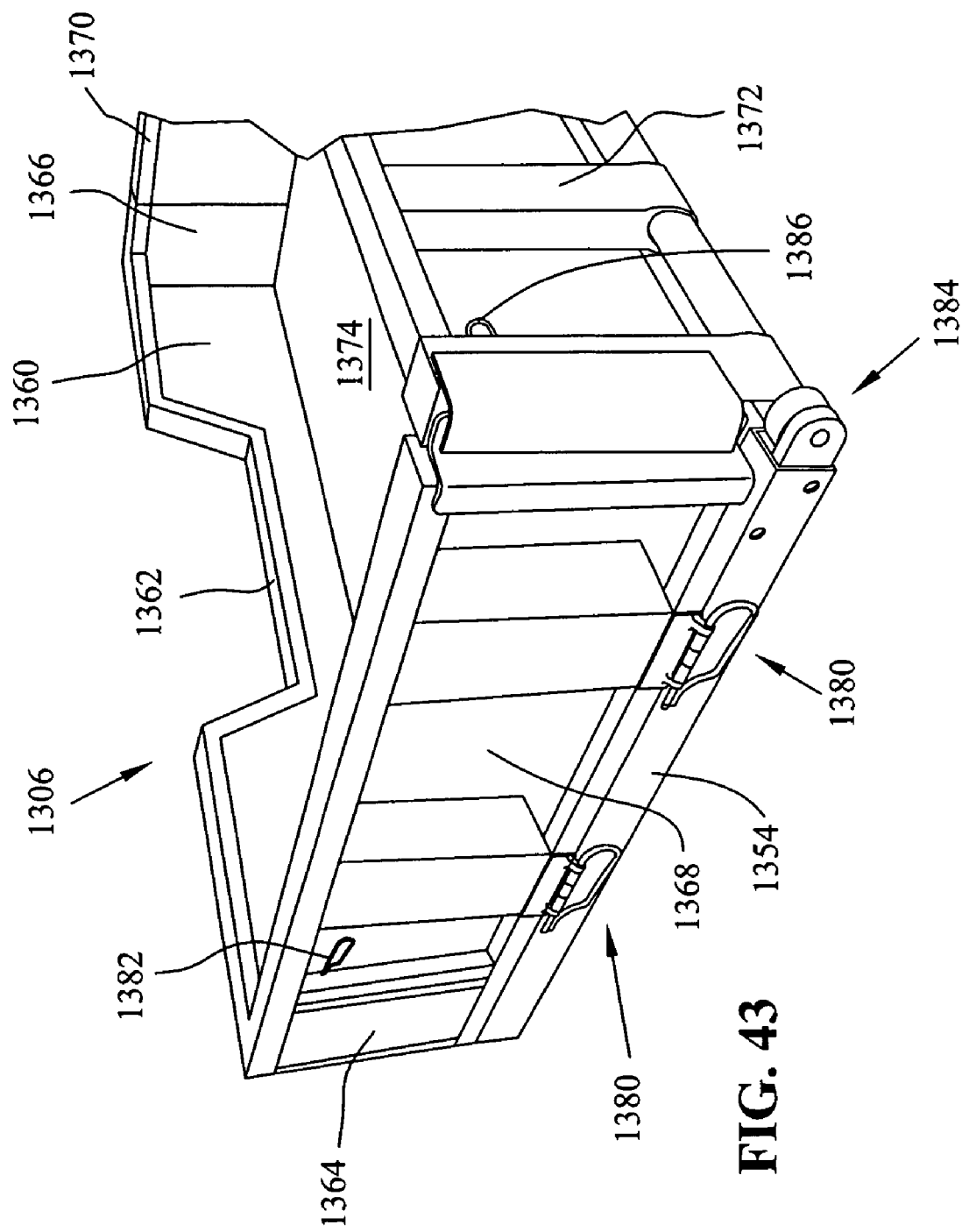
FIG. 43 is an end view in partial fragmentation of a cargo box shown in the 4×4 configuration.
Figure 44:
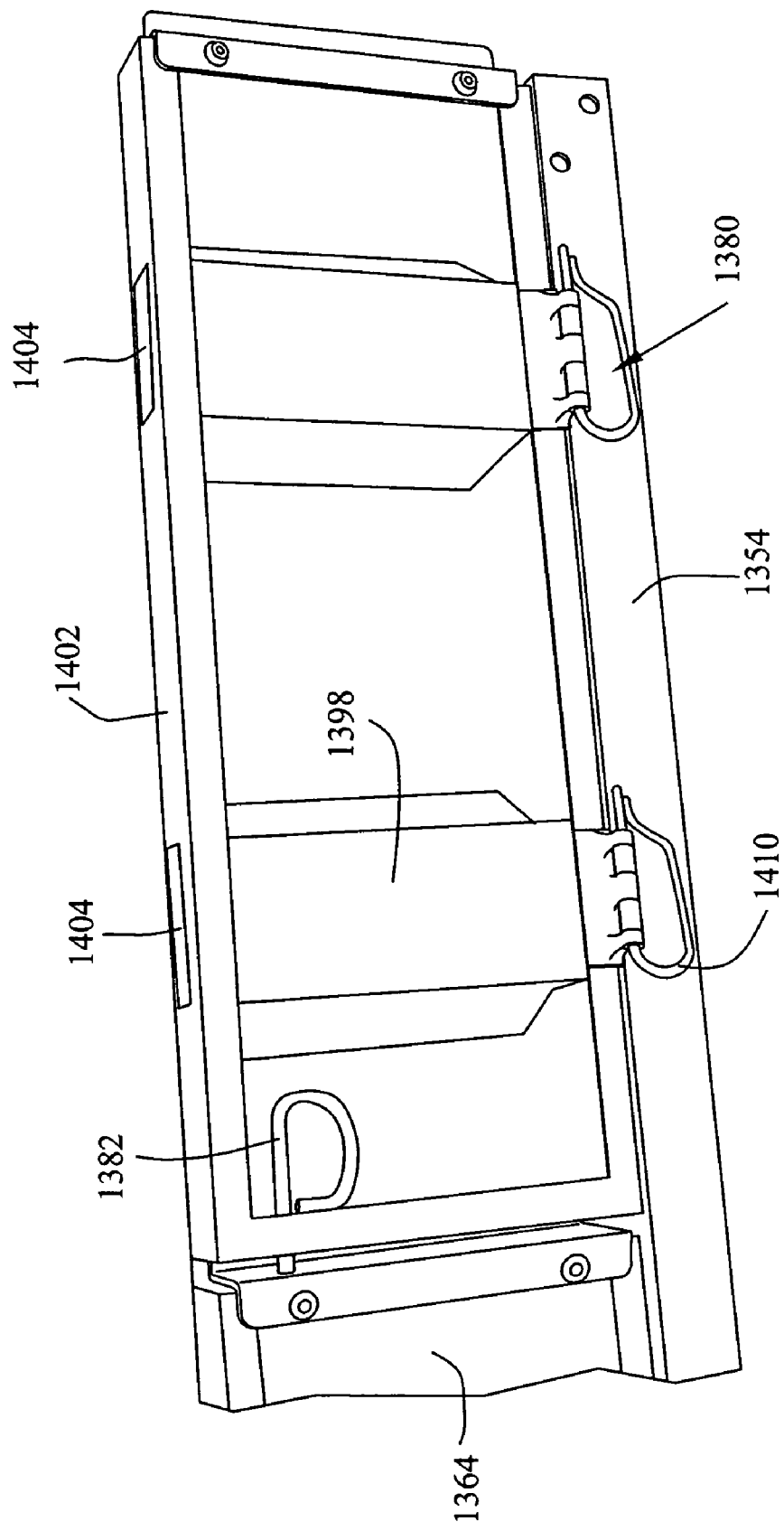
FIG. 44 is a left-hand side view of FIG. 43.

With reference now to FIGS. 43 and 44, rear support 1306 is shown in the configuration for receipt on frame member 1300 when in the 4×4 mode. As shown, rear support 1306 further includes removable side walls 1368, 1370, tailgate 1372 and floor 1374. Side wall 1368 is attached to frame member 1354 by way of hinge assemblies 1380. Side wall 1368 is attached to stub wall 1364 by way of a retractable pin 1382. Tailgate 1372 is hingedly attached to frame member 1354 by way of a hinge assembly 1384 and is pinned into a closed position by way of retractable pin 1386. The particulars of the various components will now be described in greater detail.

Figure 45:
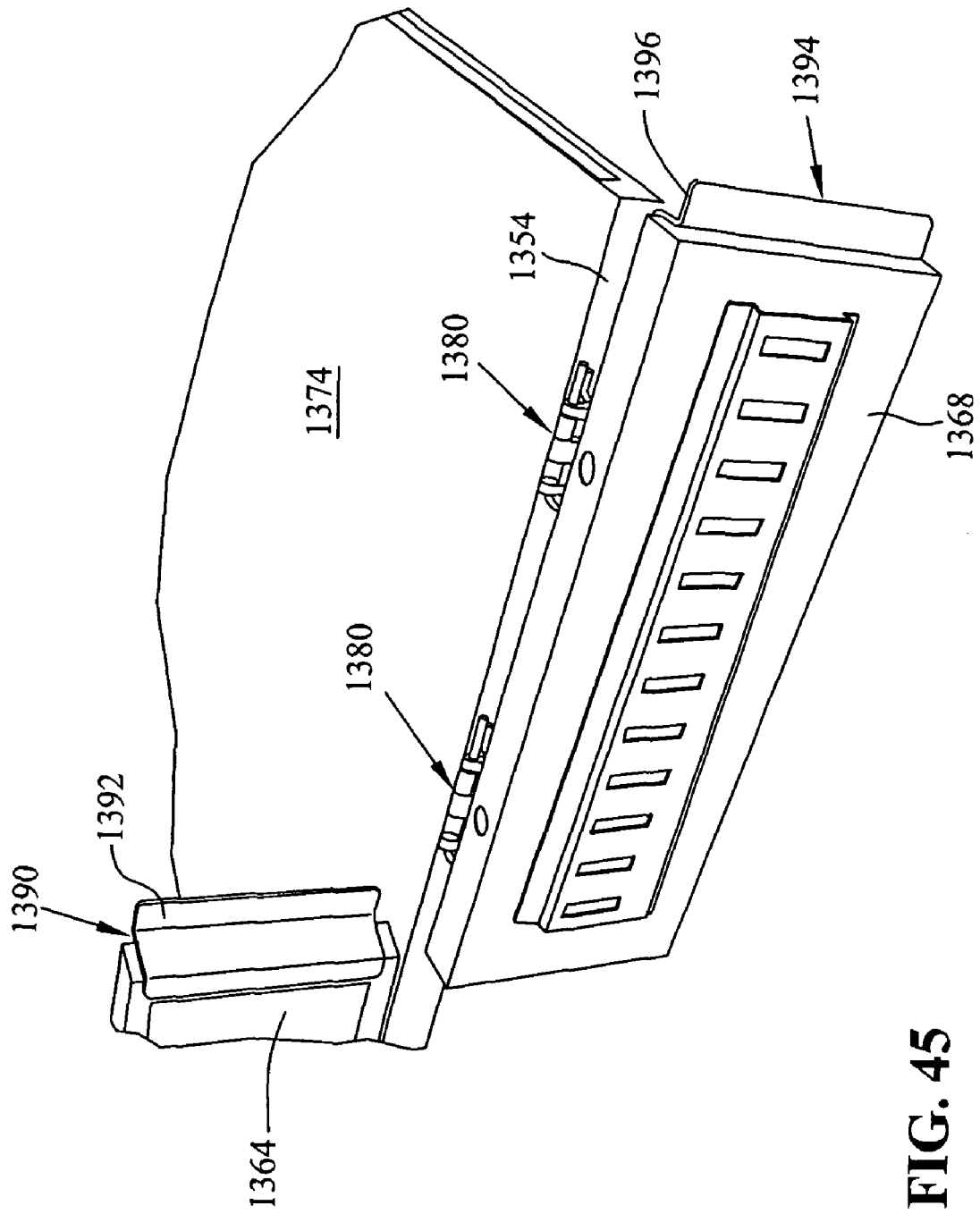
FIG. 45 is a view similar to that of FIG. 44 showing a side wall pivoted downwardly.
Figure 46:
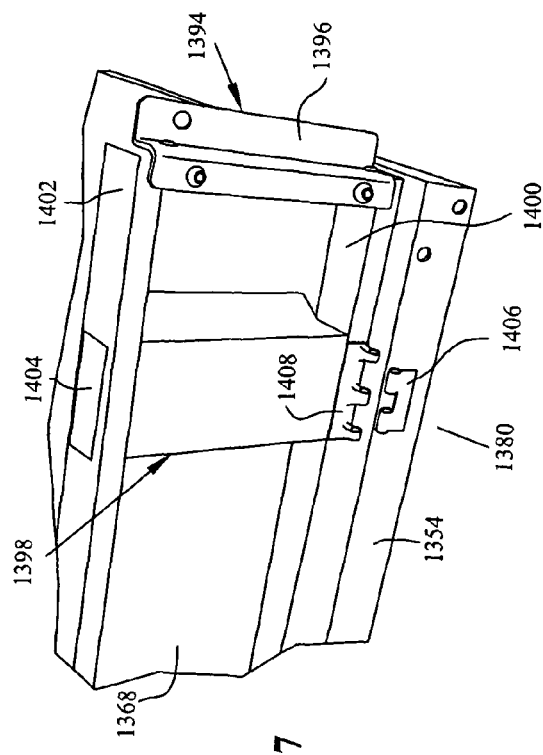
FIG. 46 shows the hinge assembly in greater detail.
Figure 47:
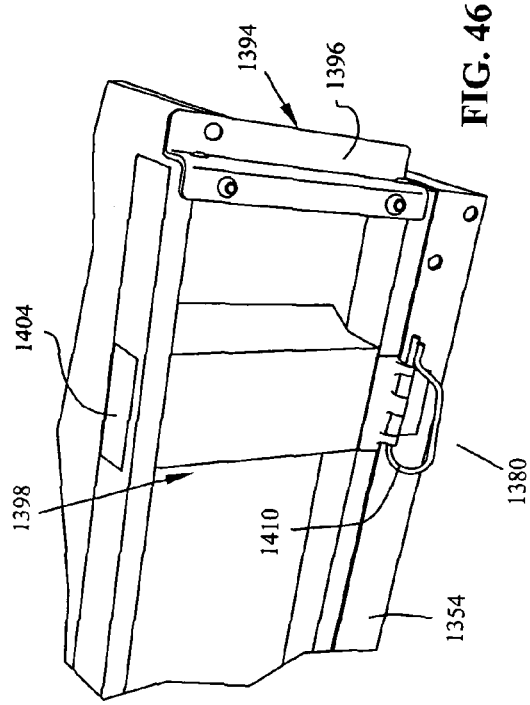
FIG. 47 is similar to that of FIG. 46 showing the hinge in a disconnected configuration.

With reference now to FIGS. 45-47, side wall 1368 is shown in the rotated down position, connected by way of hinge assemblies 1380 to frame member 1354. A Z-shaped member 1390 is attached to the rear edge of stub wall 1364 and provides a stop surface 1392. In a like manner, an identical Z-shaped member 1394 is attached to the opposite end of side wall 1368 (FIG. 46) and includes a stop surface 1396. As shown in either of FIG. 46 or 47, side walls 1368 are partly comprised of channels 1398 extending between tubular members 1400 and 1402 where tubular member 1402 includes a rectangular aperture defining stake pocket 1404 which extends down into the channel. It should be appreciated that such a stake pocket positioned along the side walls provide for insertion of a 2"×4" or the like for providing a canopy or other overhead structure. With reference still to FIGS. 46 and 47, hinge assembly 1380 is comprised of first hinge portion 1406 attached to frame member 1354, second hinge portion 1408 attached to side wall 1368 and hinge pin 1410 which clips the two together. As shown in FIG. 47, side wall 1368 is partially lifted away from frame member 1354, with the hinge pin 1410 having been removed.

Figure 48:
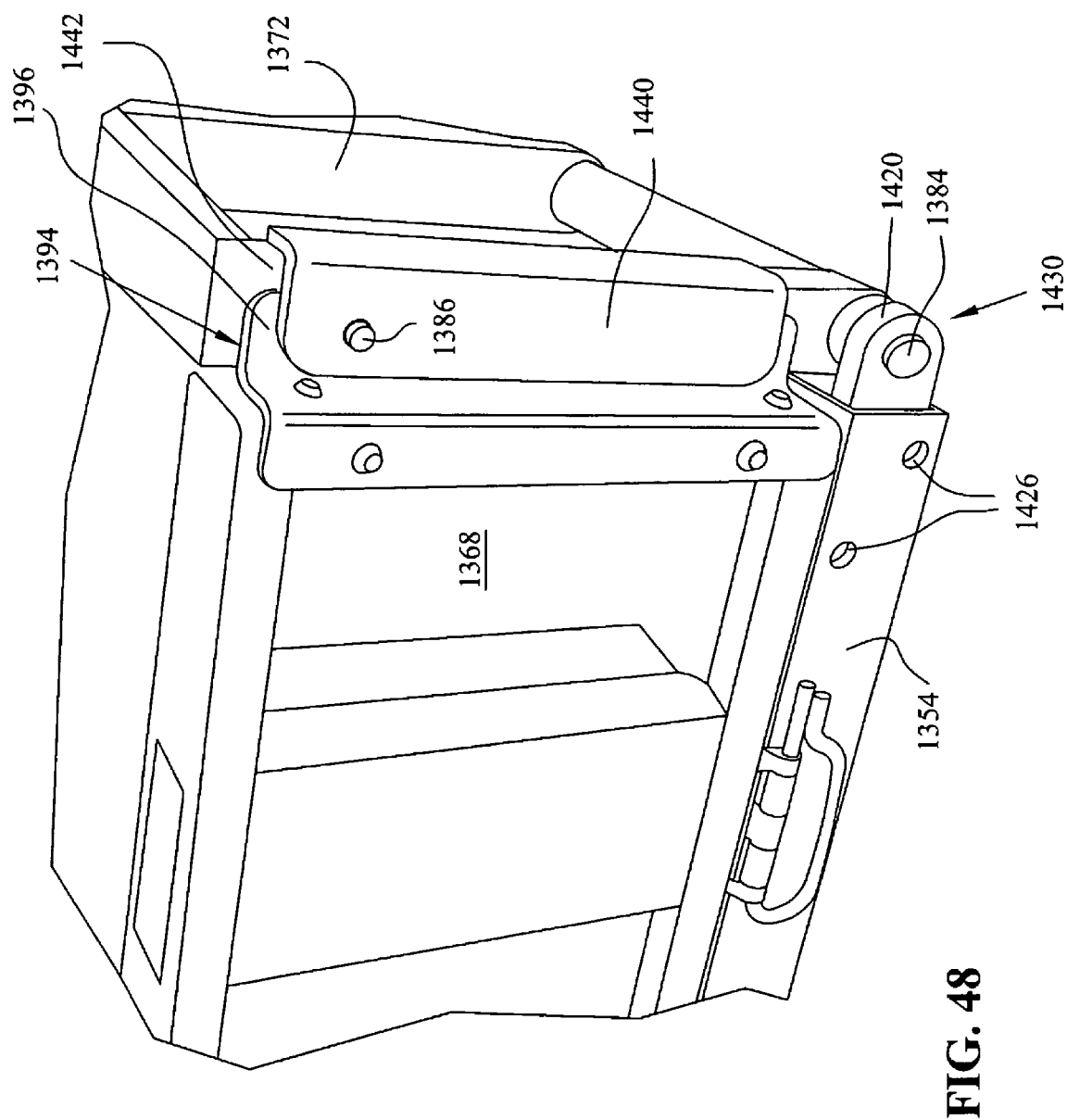
FIG. 48 shows the tailgate and its connection in a better condition.
Figure 49:
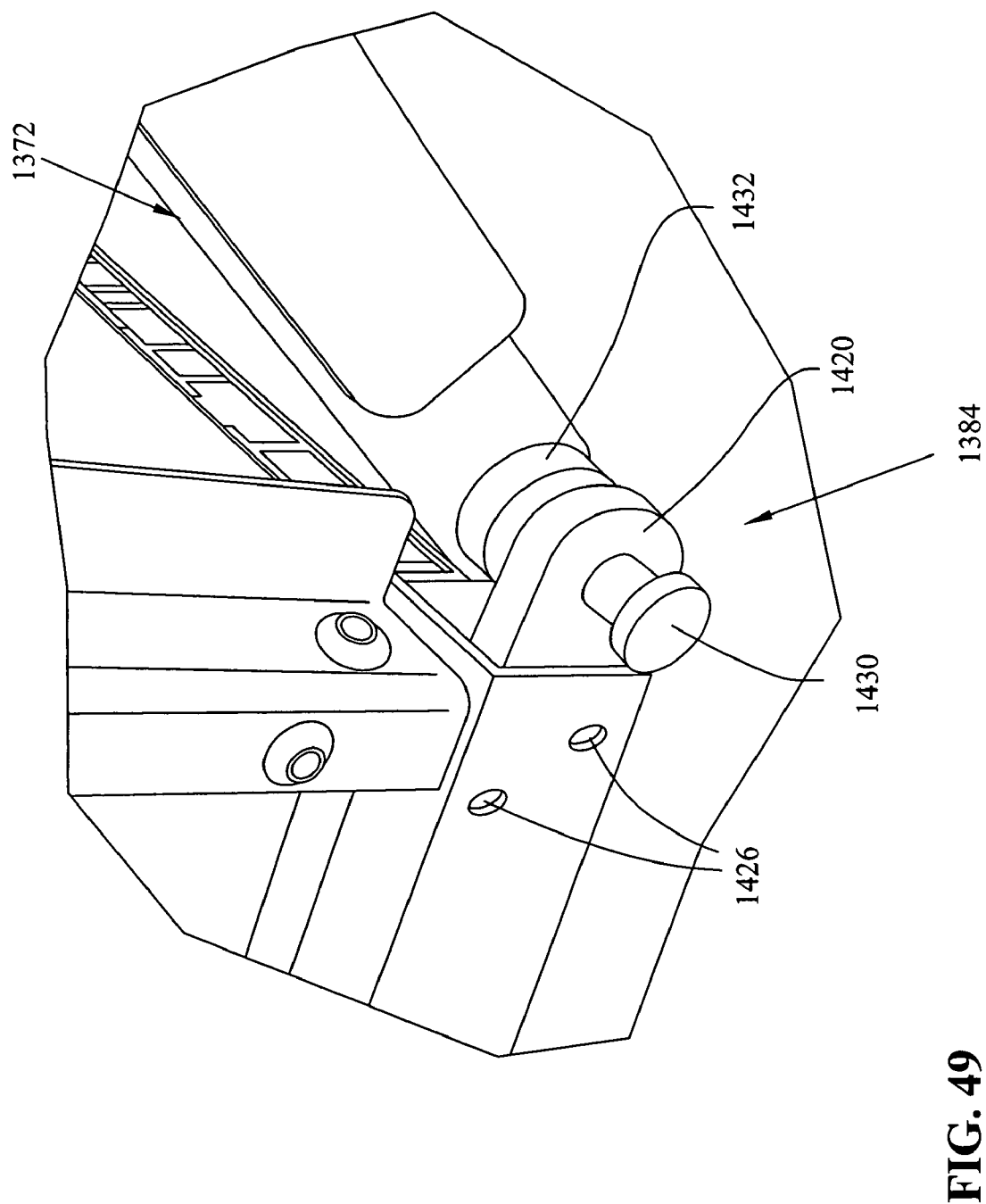
FIG. 49 is similar to that of FIG. 48 showing the tailgate being disassembled.

With respect now to FIGS. 48-51, hinge assembly 1384 will be described in greater detail. Hinge assembly 1384 includes a pivot block 1420 having an aperture 1422 (FIG. 50) and two tapped holes 1424. It should be appreciated that through apertures 1426 are provided in frame member 1354 to receive fasteners therethrough to connect pivot block 1420 to frame member 1354. A pin or other fastener such as a bolt is provided at 1430 (FIG. 49) which is receivable through a bushing 1432 and into a tapped hole in the end of tailgate 1372. Tailgate 1372 also includes an L-shaped bracket 1440 which is mounted to the outside of the tailgate in a manner to provide a gap 1442 which receives stop portion 1396 of Z-shaped member 1394 as best shown in FIG. 48 with the tailgate in its fully closed position.

Figure 52:
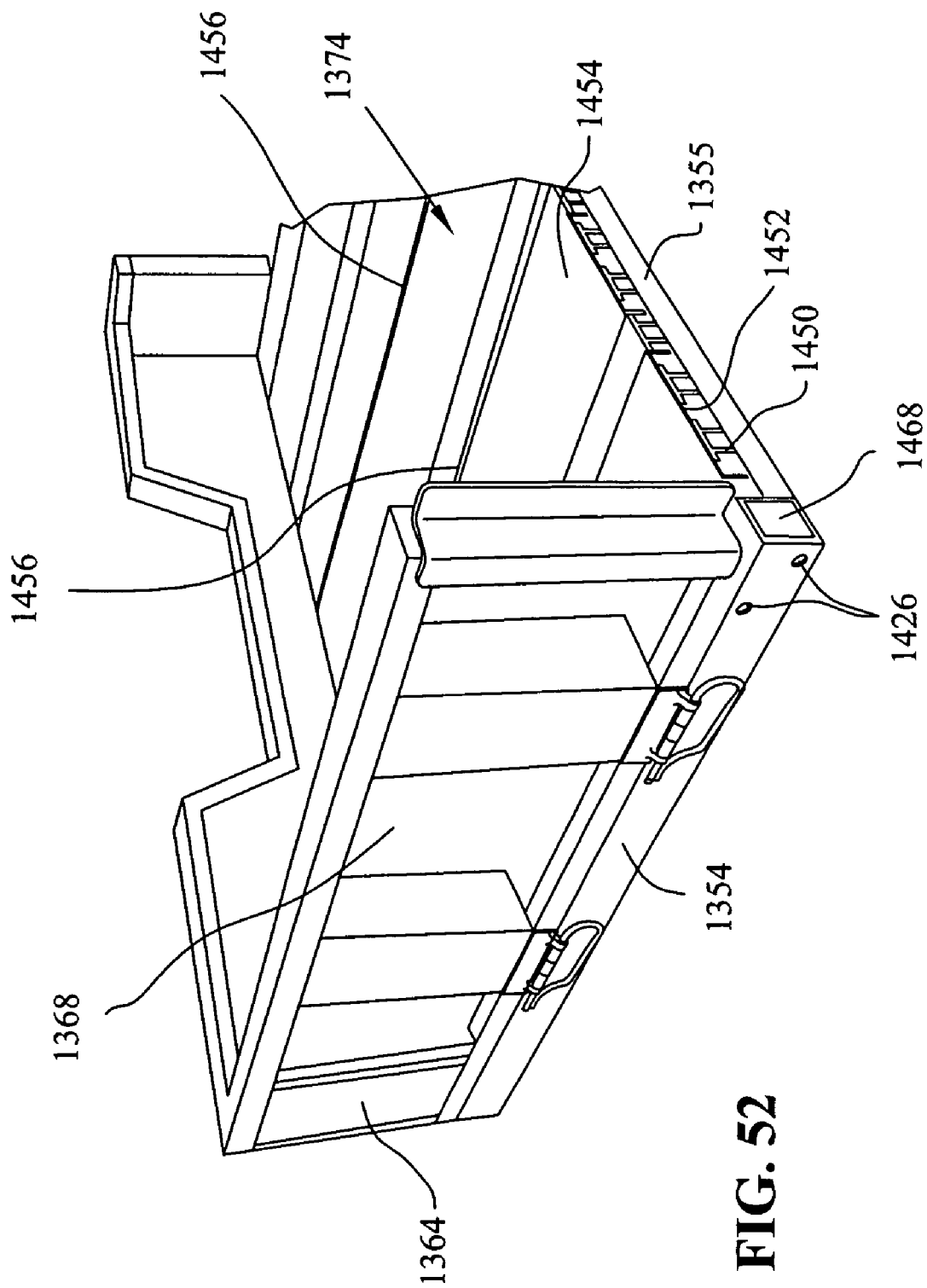
FIG. 52 is a view similar to that of FIG. 51 showing the floor assembly in greater detail.

With respect now to FIG. 52, floor 1374 is shown as comprised of a plurality of T-shaped channels, for example, extruded channels 1450 positioned across cross members 1355 and in a spaced apart manner so as to define slots 1452. Upper covers 1454 are positioned across the floor but provide at least some gaps 1456 which will align at one of the slot 1452. Thus as described above, a chair or other device could be received longitudinally into the gap 1456 and into the slot 1452 for attachment to floor 1374.

Figure 53:
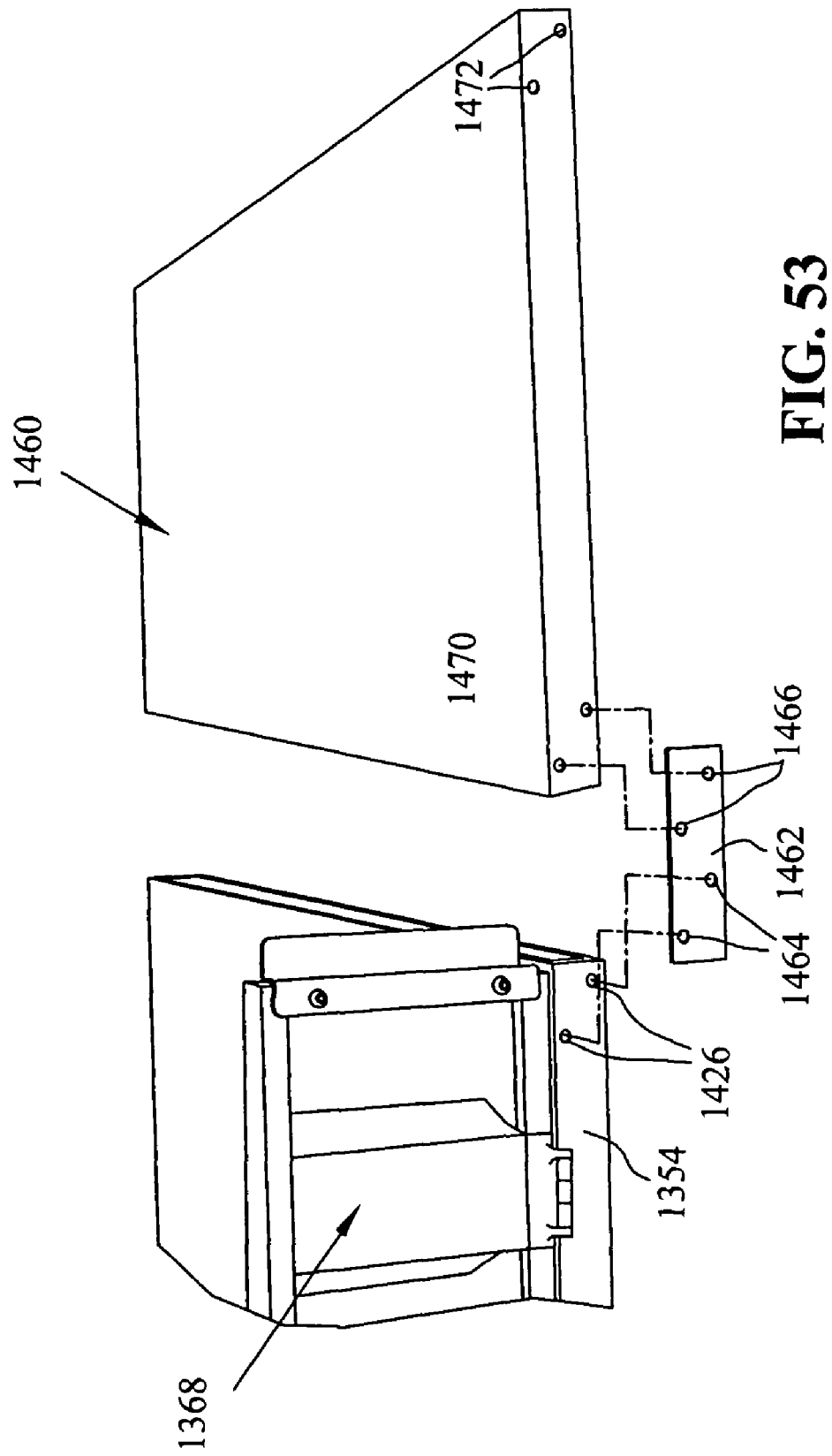
FIG. 53 shows the addition of a modular floor section to convert the cargo box into a 6×6 configuration.

If the cargo box 1306 is desired in a 6×6 configuration, an additional floor 1460 is added as shown in FIG. 53. It should be appreciated that the tailgate is modular and would be removed as described above, by removing fasteners 1430 which remove the tailgate from frame members 1354 and by removing fasteners received in apertures 1426 (FIG. 48). Connector blocks 1462 are provided having a first set of tapped holes 1464 and a second set of tapped holes 1466. Connector blocks 1462 would be inserted into ends 1468 (FIG. 52) of frame members 1354 and tapped holes 1464 would be aligned with apertures 1426. Floor 1460 would then be inserted over connector blocks 1462 with tapped holes 1466 aligned with apertures 1470 in floor 1460.

Figure 50:
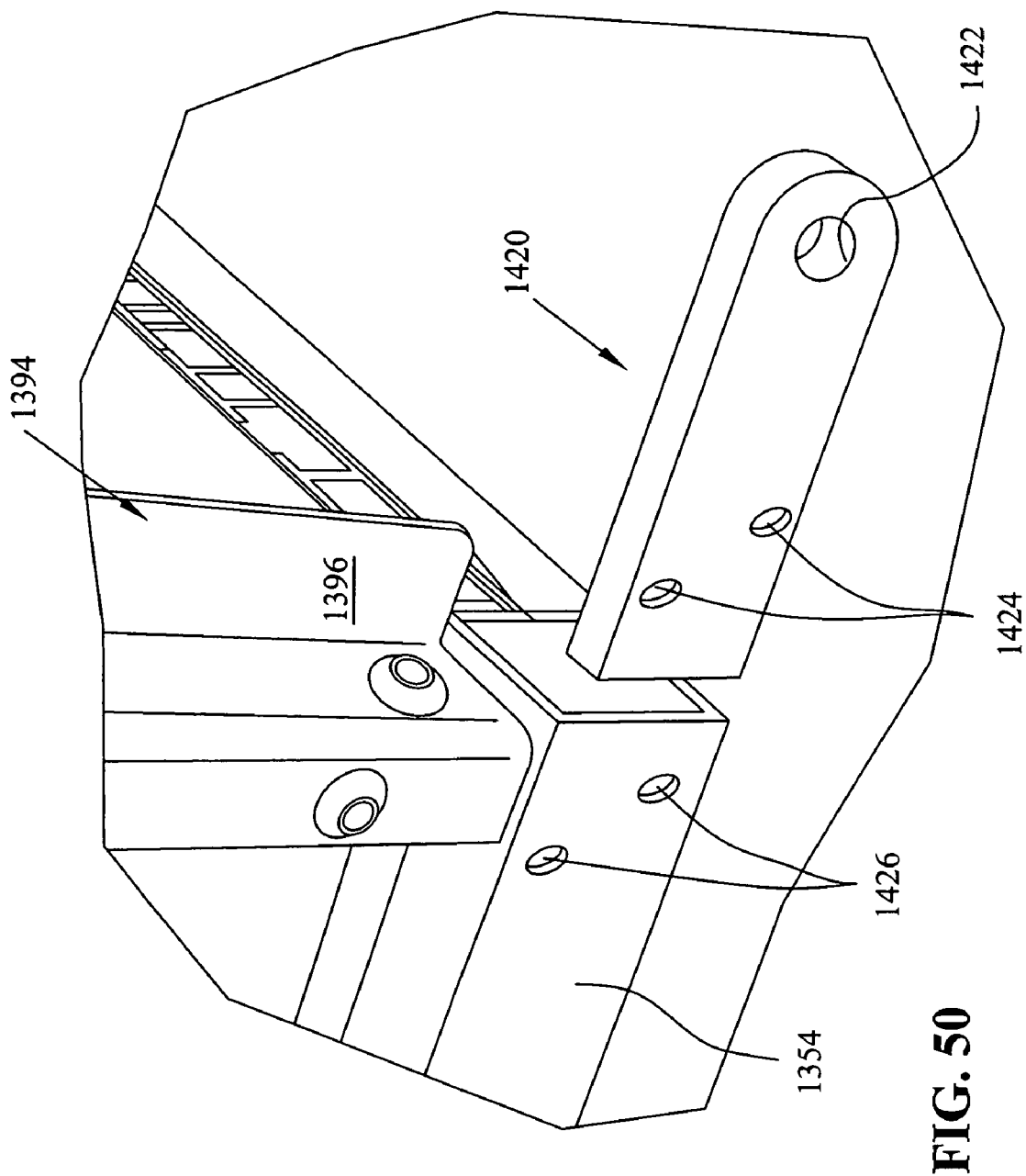
FIG. 50 shows the disassembly of the tailgate pivot assembly.
Figure 51:
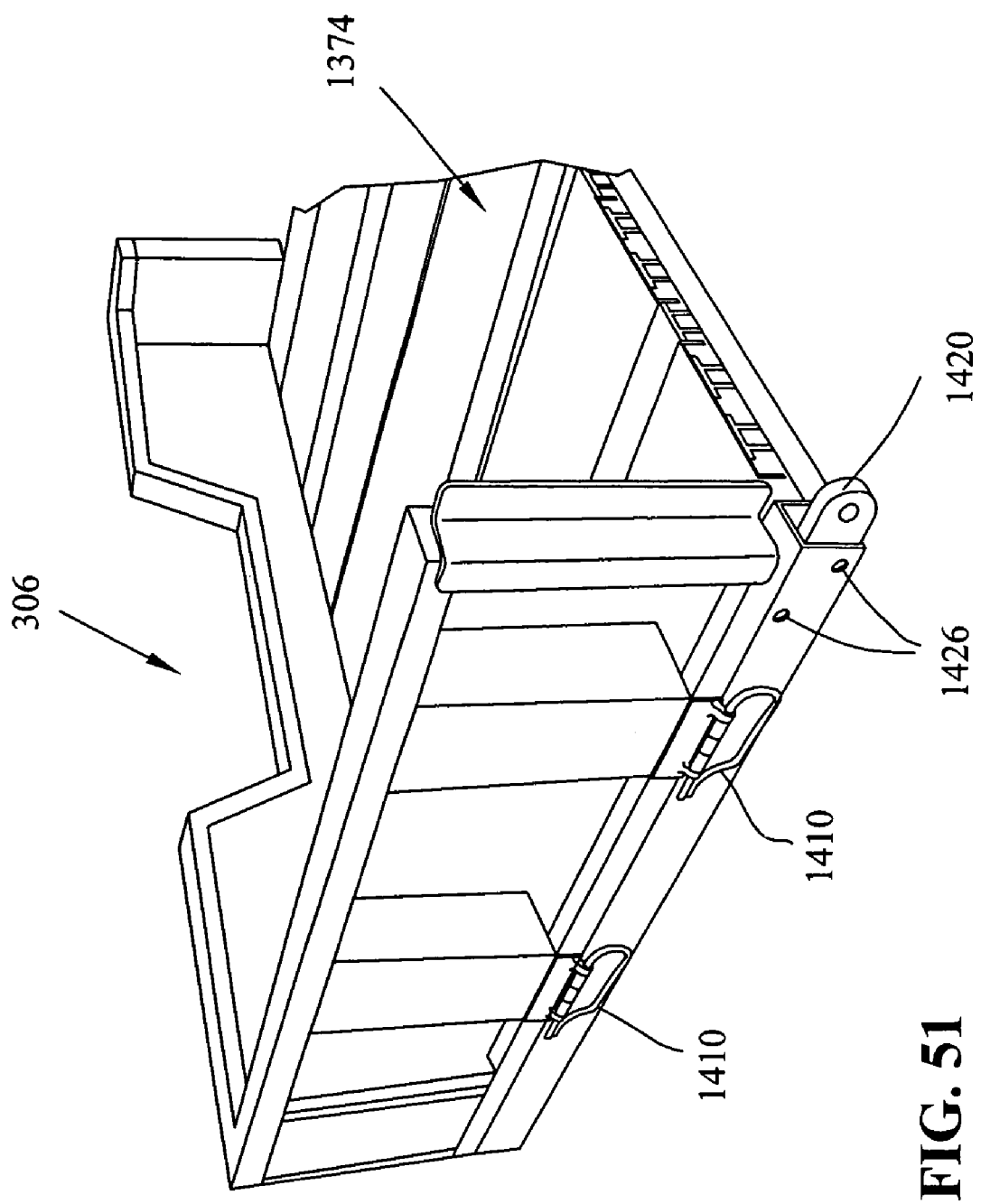
FIG. 51 is an end view showing the tailgate removed.
Figure 54:
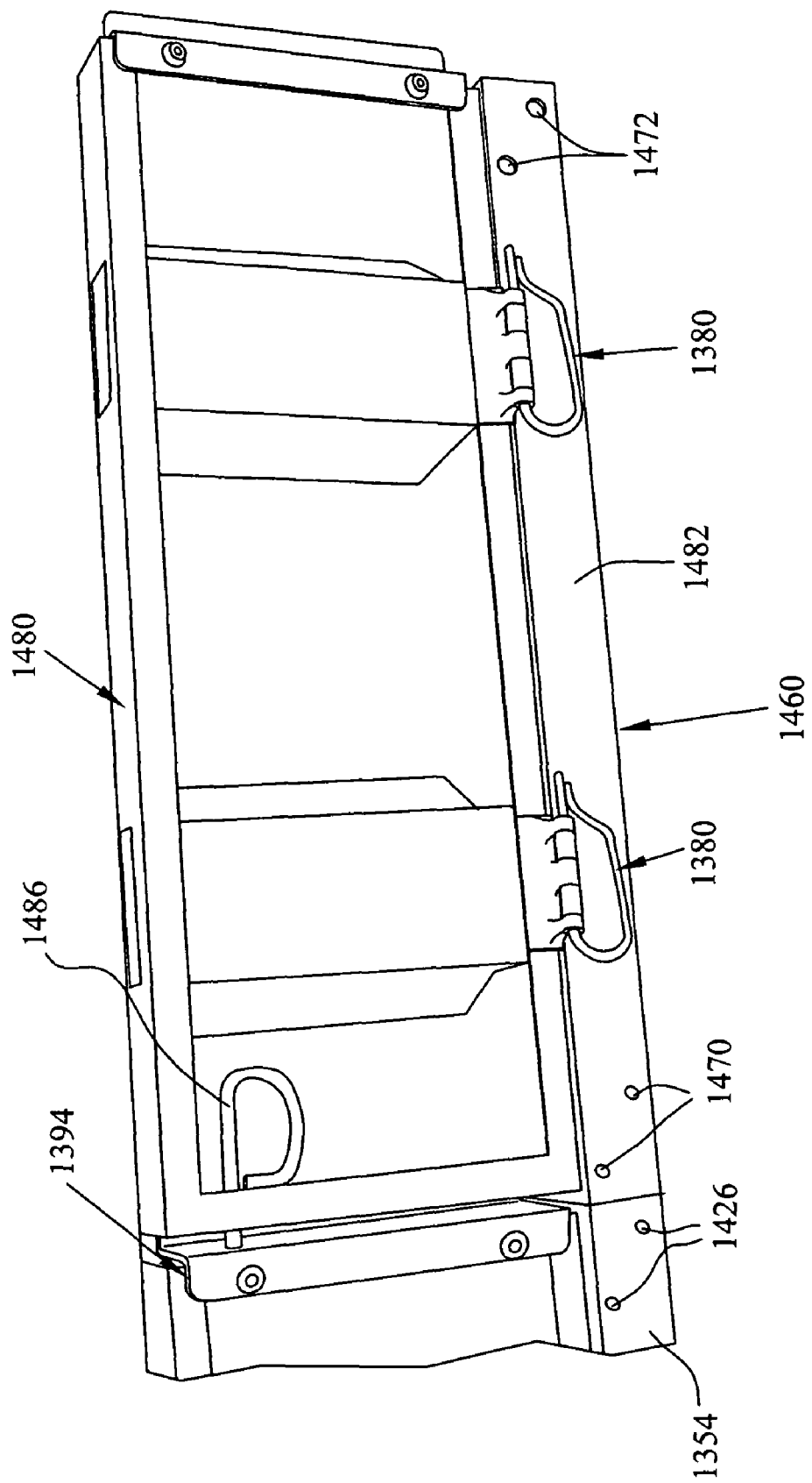
FIG. 54 shows a modular side wall section added to the cargo box of FIG. 43 to configure the cargo box into a 6×6 configuration.

Floor 1460 has apertures 1472 at the opposite end which would then receive pivot blocks 1420 (FIG. 49) and fasteners would be received through apertures 1472 into alignment with tapped holes 1424 (FIG. 50). Another side wall 1480 would be attached to frame member 1482 of floor 1460 by way of identical hinge assemblies such as 1380. As shown in FIG. 54, side wall 1480 could be pivoted upwardly until side wall 1480 hits the Z-shaped member 1394 and a pin such as 1486 could be received to hold the side wall 1480 in the closed position. It should also be appreciated that the hinge assembly 1384, and particularly pivot block 1420 (FIG. 50) would now be received within frame member 1482 with tapped holes 1424 aligning with apertures 1472. This allows tailgate 1372 (which has been removed from the 4×4 configuration) to be added into the 6×6 configuration.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A utility vehicle comprising:
   a main frame;
   a plurality of ground engaging members supporting said main frame above the ground;
   an engine supported by said main frame and providing power to said utility vehicle;
   a rear cargo platform supported by said main frame;
   at least one connector having a gripping member; and
   a plurality of connection points located on said rear cargo platform adjacent a top surface thereof and disposed in a matrix, said plurality of connection points adapted to removably couple one or more connectors adapted to secure an item to said rear cargo platform, at least some of said connection points define an item location and orientation, and said matrix is configured to couple the item in more than one location or in more than one orientation, wherein said at least one connector gripping member has a locked and an unlocked position with the connection point.

2. A utility vehicle as in claim 1, wherein said item is coupled to said rear cargo platform by at least two said connection points.

3. A utility vehicle as in claim 1, wherein at least one said connector is an expansion retainer.

4. A utility vehicle as in claim 1, wherein said connection points are apertures adapted to receive said connectors.

5. A utility vehicle as in claim 4, further comprising a rail, said rail including a slot and two or more connectors adapted to secure said rail to two or more said apertures, and said slot comprising a cross-section having a narrow portion disposed on top of a wide portion and being adapted to slidably receive one or more connectors to secure an item to said rear cargo platform.

6. A utility vehicle as in claim 1, wherein said plurality of connection points are disposed in one or more slots comprising a cross-section having a narrow portion disposed on top of a wide portion and being adapted to slidably receive one or more said connectors.

7. A utility vehicle as in claim 1, wherein said cross-section further includes a portion on top of said narrow portion that is wider than said narrow portion.

8. A utility vehicle as in claim 1, further comprising at least one aperture disposed in one said one or more slots, said aperture being adapted to receive one or more said connectors and to enable said one or more said connectors to slide in said slot.

9. A utility vehicle as in claim 1, wherein said slots are integrated in said rear cargo platform.

10. A utility vehicle as in claim 1, wherein said main frame comprises at least three couplings adapted to detachably couple said main frame to a modular subsection or to said cargo platform, and said couplings are spaced apart to substantially prevent said modular subsection from pivoting relative to said main frame when said modular subsection is coupled to said main frame.

11. A utility vehicle as in claim 10, wherein said rear cargo platform extends substantially over the area said subsection would occupy if it were coupled to said main frame.

12. A utility vehicle as in claim 10, further comprising a subsection cargo platform, wherein said subsection cargo platform is pivotably coupled to said rear cargo platform and is adapted to pivot forward until it lays on top of said rear cargo platform.

13. A utility vehicle as in claim 10, further comprising said subsection cargo platform, wherein said subsection cargo platform is pivotably coupled to at least two of said couplings of said main frame and is adapted to pivot forward until it lays on top of said rear cargo platform.

14. A utility vehicle as in claim 10, further comprising a support frame including two longitudinal members, two or more cross-members, and two couplings, wherein said support frame is coupled to said rear cargo platform.

15. A utility vehicle as in claim 14, wherein said support frame is pivotably coupled to two of said at least three couplings of said main frame.

16. A utility vehicle as in claim 10, further comprising a modular subsection adapted to detachably couple to said main frame, said modular subsection comprising:
   a subsection frame;
   two or more ground engaging members supporting said subsection frame above the ground; and
   at least three subsection front couplings adapted to detachably couple to said at least three couplings of said main frame.

17. A utility vehicle as in claim 16, further comprising a plurality of connection points located on said subsection cargo platform and disposed in a matrix, said plurality of connection points adapted to removably couple one or more connectors adapted to secure an item to said subsection cargo platform.

18. A utility vehicle as in claim 16, further including at least three subsection rear couplings for detachably coupling a second subsection, said rear couplings being spaced apart to substantially prevent said modular subsection from pivoting relative to said second subsection.

19. A utility vehicle as in claim 16, further comprising a support frame, wherein said support frame is coupled to said subsection cargo platform and is pivotably coupled to two of said at least three subsection rear couplings.

20. A utility vehicle as in claim 19, wherein said subsection cargo platform is coupled to said rear cargo platform.

21. A utility vehicle comprising:
   a main frame;
   a plurality of ground engaging members supporting said main frame above the ground;
   an engine supported by said main frame and providing power to said utility vehicle;
   a rear cargo platform supported by said main frame; and
   a plurality of connection points located on said rear cargo platform and disposed in a matrix; and
   an accessory having accessory connection points arranged to cooperate with at least a portion of the rear cargo platform connection points to mount the accessory to the rear cargo platform, the accessory selected from the group consisting of a seat, a foot pedestal, and a gun mount.

22. A utility vehicle as in claim 21, wherein said accessory is coupled to said rear cargo platform by at least two said connection points which define an accessory location and orientation.

23. A utility vehicle as in claim 22, wherein said matrix is configured to couple said accessory in more than one location or in more than one orientation.

24. A utility vehicle as in claim 21, wherein said rear cargo platform connection points are apertures.

25. A utility vehicle as in claim 24, wherein said accessory connection points are expansion retainers.

26. A utility vehicle as in claim 21, wherein said seat is a bench seat which can be mounted either longitudinally or transversely.

27. A utility vehicle as in claim 21, wherein said plurality of rear cargo platform connection points is defined by longitudinally extending slots on the rear cargo platform.

28. A utility vehicle as in claim 3, wherein the expansion retainer includes a handle and a grommet operably coupled to the handle, whereby when said handle is in a closed position, said grommet expands to retain said connector within said connection point, and when said grommet is in an open position, said grommet contracts such that said connector is moveable along said connection point.

29. A utility vehicle as in claim 1, further comprising an item to be removably coupled to the rear cargo platform.

30. A utility vehicle as in claim 29, wherein the item is selected from the group consisting of a seat, a foot pedestal, and a gun mount.

* * * * *